United States Patent
Nigro

(10) Patent No.: US 11,960,933 B2
(45) Date of Patent: Apr. 16, 2024

(54) VERSIONED PROGRESSIVE CHUNKED QUEUE FOR A SCALABLE MULTI-PRODUCER AND MULTI-CONSUMER QUEUE

(71) Applicant: Red Hat, Inc., Raleigh, NC (US)

(72) Inventor: Francesco Nigro, Milan (IT)

(73) Assignee: RED HAT, INC., Raleigh, NC (US)

( * ) Notice: Subject to any disclaimer, the term of this patent is extended or adjusted under 35 U.S.C. 154(b) by 360 days.

(21) Appl. No.: 16/863,551

(22) Filed: Apr. 30, 2020

(65) Prior Publication Data

US 2021/0342190 A1    Nov. 4, 2021

(51) Int. Cl.
    *G06F 9/46*     (2006.01)
    *G06F 9/48*     (2006.01)
    *G06F 9/50*     (2006.01)

(52) U.S. Cl.
    CPC .......... *G06F 9/5016* (2013.01); *G06F 9/4881* (2013.01); *G06F 2209/5013* (2013.01); *G06F 2209/5018* (2013.01)

(58) Field of Classification Search
    CPC ................. G06F 9/5016; G06F 9/4881; G06F 2209/5013; G06F 2209/5018
    USPC ......................................................... 718/104
    See application file for complete search history.

(56) References Cited

U.S. PATENT DOCUMENTS

| | | |
|---|---|---|
| 8,689,237 B2 | 4/2014 | Dice et al. |
| 8,838,944 B2 | 9/2014 | Chen et al. |
| 8,868,822 B2 * | 10/2014 | Komori ............... G06F 12/0246 711/100 |
| 9,361,145 B1 * | 6/2016 | Wilson .................... G06F 13/28 |
| 10,146,439 B2 | 12/2018 | Gollapudi et al. |
| 10,387,307 B2 | 8/2019 | Enz et al. |
| 10,782,970 B1 * | 9/2020 | Nigro ........................ G06F 9/54 |
| 2006/0048162 A1 * | 3/2006 | Boult .................... G06F 9/3004 719/310 |
| 2008/0177974 A1 * | 7/2008 | Chiang ............... G06F 12/1018 711/E12.002 |
| 2013/0198479 A1 * | 8/2013 | Jones .................... G06F 9/3887 711/170 |

(Continued)

FOREIGN PATENT DOCUMENTS

| | | | | |
|---|---|---|---|---|
| CN | 105610947 A | | 5/2016 | |
| DE | 102013200997 A1 | | 8/2013 | |
| GB | 2262639 A | * | 6/1993 | ......... G06F 17/2205 |

OTHER PUBLICATIONS

"Fetch-and-add", Wikipedia, Mar. 3, 2019 (Year: 2019).*

(Continued)

*Primary Examiner* — Bradley A Teets

(57) ABSTRACT

A method includes receiving, by a producer thread of a plurality of producer threads, an offer request associated with an item. The producer thread increases a sequence and determines (i) a chunk identifier of a memory chunk from a pool of memory chunks and (ii) a first slot position in the memory chunk to offer the item. The producer thread also writes the item into the memory chunk at the first slot position. Then, a first consumer thread of a plurality of consumer threads determines the first slot position of the item and consumes the item at the first slot position. A second consumer thread consumes another item at a second slot position in the memory chunk and recycles the memory chunk.

20 Claims, 14 Drawing Sheets

(56) References Cited

U.S. PATENT DOCUMENTS

| | | | |
|---|---|---|---|
| 2013/0198480 A1* | 8/2013 | Jones | G06F 12/023 711/170 |
| 2016/0092273 A1* | 3/2016 | Reed | G06F 12/023 718/101 |
| 2017/0132037 A1* | 5/2017 | Sevigny | G06F 9/5044 |
| 2020/0065012 A1* | 2/2020 | Breslow | G06F 3/0604 |

OTHER PUBLICATIONS

Alexander Kriz; "Lock-Free Multi-Producer Multi-Consumer Queue on Ring Buffer"; Linux Journal, LLC; Jun. 12, 2013; (10 Pages).
Cameron Desrochers; "Detailed Design of a Lock-Free Queue"; © 2011-2015 Cameron Desrochers; Blog Posted Nov. 6, 2014 (10 Pages).

* cited by examiner

VERSIONED PROGRESSIVE CHUNKED QUEUE FOR A SCALABLE MULTI-PRODUCER AND MULTI-CONSUMER QUEUE

BACKGROUND

Computer systems may routinely perform tasks and process work such as offer requests. For example, processors may execute instructions to read, write, and copy memory entries, according to offer requests. Tasks may typically be added to a queue and completed on a first-in-first-out ("FIFO") basis or a last-in-first-out ("LIFO") basis.

The processors may use threads to complete tasks and process work such as offer requests. Physical resources, such as a hardware thread, may be associated with a processing core. For example, there may be a single hardware thread per core on a processor. Software threads (e.g., threads created by an application or a program) may also be scheduled to perform tasks. A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

SUMMARY

The present disclosure provides new and innovative systems and methods of producing and consuming offer requests in a progress chunked queue. In an example, a method includes receiving, by a producer thread of a plurality of producer threads, an offer request associated with an item. Responsive to receiving the offer request, the method includes increasing, by the producer thread, a sequence. The method also includes determining, by the producer thread, (i) a chunk identifier, associated with the sequence, of a memory chunk from a pool of memory chunks and (ii) a first slot position, from the sequence, in the memory chunk to offer the item. Additionally, the method includes writing, by the producer thread, the item into the memory chunk at the first slot position. Then, a first consumer thread of a plurality of consumer threads determines the first slot position of the item and consumes the item at the first slot position. A second consumer thread of the plurality of consumer threads consumes another item at a second slot position in the memory chunk. Additionally, the second consumer thread recycles the memory chunk.

In an example, a system includes a memory configured to store a plurality of memory chunks and at least one processor configured to execute a plurality of producer threads and a plurality of consumer threads. A producer thread of the plurality of producer threads is configured to receive an offer request associated with an item and responsive to receiving the offer request, increase a sequence. The producer thread is also configured to determine (i) a chunk identifier, associated with the sequence, of a memory chunk from a pool of memory chunks and (ii) a first slot position, from the sequence, in the memory chunk to offer the item. Additionally, the producer thread is configured to write the item into the memory chunk at the first slot position. A first consumer thread of the plurality of consumer threads is configured to consume the item at the first slot position. A second consumer thread of the plurality of consumer threads is configured to consume another item at a second slot position in the memory chunk. Additionally, the second consumer thread is configured to recycle the memory chunk.

In an example, a method includes receiving, by a consumer thread of a plurality of consumer threads, a consume request associated with an element and responsive to receiving the consume request, reading, by the consumer thread, a consumer sequence and a consumer buffer. The method also includes extracting, by the consumer thread, (i) a chunk identifier, associated with the consumer sequence and (ii) a slot position in a memory chunk from the consumer sequence. Additionally, the method includes determining, by the consumer thread, that a position of the element mismatches the slot position in the memory chunk from the consumer sequence and determining, by the consumer thread, that the memory chunk is recyclable. The method also includes increasing, by the consumer thread, the consumer sequence and consuming, by the consumer thread, the element at the slot position.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
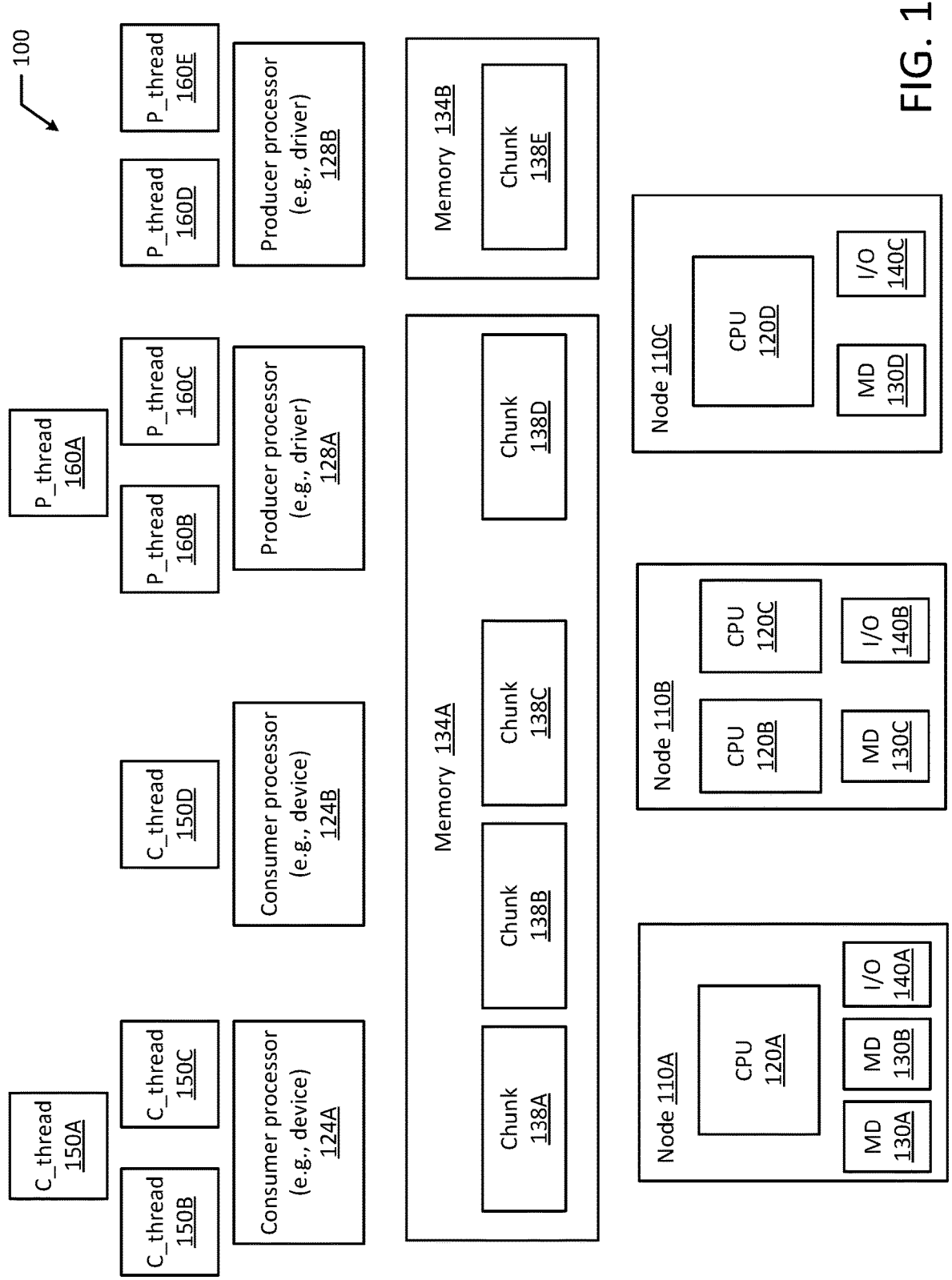
FIG. 1 illustrates a block diagram of an example computing system according to example embodiments of the present disclosure.

Techniques are disclosed for producing and consuming offer requests in a progressive chunked queue that is highly-scalable for a multi-producer and multi-consumer configuration. For example, the disclosed systems and methods may be used to produce and consume offer requests resulting from an application or software, such as middleware that lays between an operating system (OS) and an application(s) running on the OS. An example middleware is JBoss® Enterprise Application Platform ("EAP"). Computer services (e.g., Java middleware services, Red Hat® JBoss® EAP) depend heavily on performing work (e.g., producing offer requests) from a plurality of producer threads. Additionally, a multi-tenant environment such as OpenShift (e.g., the OpenShift Container Platform) may need to interface with and submit requests from multiple worker threads to a single core thread that will execute them. The disclosed systems and methods may be used in scenarios with requests from several worker threads or producers that are executed by a single thread.

Typically, multi-producer concurrent queues are based on compare-and-swap instructions, which do not scale (i.e., negatively scale) with the quantity of offering threads. For example, on the offering or producer side, concurrent unbounded queue implementations often rely on compare-and-swap ("CAS") instructions to move a producer sequence forward. Typically, the concurrent unbounded queue implementation uses a producer sequence value and an indicator on the slot where the produced item will be stored to notify a consumer(s) that something new has been added to the queue. This mechanism prevents the consumer from invaliding the producer by polling it continuously and ensures that the producer sequence is followed by other producers, which distributes the cache-misses over the produced slots in a more cache-friendly manner. If the consumer was allowed to continuously poll the producer sequence, every time the consumer checked or polled the producer sequence, the consumer may invalidate the cacheline and slow down the producer.

The concurrent unbounded queue implementations rely on CAS instructions because the instructions allows additional control (similar to that of a spin-lock) of exclusively writing the indicator per offering or producing thread while also allowing a producer to allocate new memory chunks to the queue when the queue is full. After allocating a new memory chunk, the other producers may continue to progress after the new memory chunk is allocated. A CAS instruction is an atomic instruction in multithreading to achieve synchronization. The CAS instruction compares the contents of a memory location with a given value and, only if they are the same, modifies the contents of that memory location to a new given value. The CAS instruction is performed as a single atomic operation, which guarantees that the new value is calculated based on up-to-date information. For example, if the value had been updated by another thread in the meantime, writing the value would fail. However, multi-producer concurrent queues based on CAS instructions do not scale along with added producers and work may be wasted due to CAS failures that may cause poor system performance.

Specifically, a CAS instruction scales negatively with the quantity of threads, which prevents performance improvements for queues that have multiple threads instead of a single thread. For example, most CAS-based queues use a back-off strategy on each failed offer due to contention, which artificially increases throughput by reducing the contention, but ultimately makes latencies much worse (e.g., to avoid contention, each producer waits before performing the offer and making any progress).

To provide a highly-scalable system and prevent wasted work due to CAS failures, a progressively chunked queue may instead rely on fetch-and-add instructions, which allows the queue to scale with the quantity of producers. A fetch-and-add ("FAA") instruction atomically increments the contents of a memory location by a specified value. For example, the FAA instruction performs an operation to increment a value at an address (e.g., address_X) by an amount (e.g., amount_A) in such a way that if the operation is executed by a process in a concurrent system, no other process will see an intermediate result. The FAA instruction advantageously allows a processor to atomically increment a value in memory while preventing multiple processor collisions. Chunked queues may use a linked list of fixed size arrays or chunks, and as a consumer catches up with the producer, the empty or redundant chunks may be discarded such that the overall footprint of the chunked queue decreases. However, the progressive chunked queue may reuse empty or redundant chunks that have been consumed and may also allocate and add new chunks to the queue.

The progressive chunked queue is based on an assumption that each producer can be "left behind" spatially, which reduces the coordination efforts among them to guarantee individual progress. Unlike the CAS-based queues, the progressive chunked queue is not "just" lock-free, but instead is "mostly" wait free because it depends on whether a new memory chunk allocation takes place while offering. If a new memory chunk is needed, the offer side is lock-free although "progressive" given that any producer can make progress and add a new memory chunk instead of relying on a single producer to make progress before other producers can progress. Specifically, any of the producers may make progress and add a new memory chunk based on their ability and speed of performing their current work items. Additionally, multiple consumers may make progress by using a lock-free process to mark each slot in the pooled chunks with an epoch sequence in order to coordinate producers and consumers. For example, different consumers on the same chunks may proceed right after having incremented (e.g., with a CAS operation) a shared consumer sequence, without waiting for the previous element(s) to be fully consumed. Using the assumptions above, the systems and methods disclosed herein advantageously enables the system to consume multiple items concurrently from different threads without using a lock. The systems and methods also allow recycling pooled chunks, which advantageously reduces the memory footprint of the system and also improves the locality of the data structures involved. Furthermore, the systems and methods disclosed herein allow for the creating of computation pipelines with much higher overall throughput and lower latencies for producer tasks. For example, initial tests indicate that on an 8-core machine with 4 producers and 4 consumers (e.g., each producer and consumer on a different core) the system is capable of performing 5 times more operations (e.g., 40 operations per microsecond vs. 8 operations per microsecond). In other examples, multiple 8-core processors may be used with multiple producers and consumers spread across the 8-core processors. In some instances, an 8-core processor may be dedicated solely to producers while another 8-core processor is dedicated solely to consumers.

FIG. 1 depicts a high-level component diagram of an example computing system 100 in accordance with one or more aspects of the present disclosure. The computing system 100 may include a memory (e.g., memory devices 134A-D) with a plurality of memory chunks (e.g., chunks 138A-E) and one or more processors (e.g., consumer processor(s) 124A-B and producer processor(s) 128A-B). Each processor may include one or more cores that execute various threads. For example, consumer threads (e.g., C_threads 150A-D) and producer threads (e.g., P_threads 160A-E) may execute instructions much like a software thread. In an example, the threads may be software thread, which may be created by programs or applications (e.g., applications within a virtual machine). In another example, the threads may be hardware threads. The processors (e.g., consumer processor(s) 124A-B and producer processor(s) 128A-B) may execute tasks or process offer requests using the consumer threads (e.g., C_threads 150A-D) and producer threads (e.g., P_threads 160A-E).

The threads (e.g., C_threads 150A-D and P_threads 160A-E) may be ordered sequences of instructions that allow the processors (e.g., consumer processor(s) 124A-B and producer processor(s) 128A-B) to execute multiple instruction streams simultaneously. For example, producer processor 128A may simultaneously run three instruction streams on P_threads 160A-C.

The processors (e.g., consumer processor(s) 124A-B and producer processor(s) 128A-B) may be physical processors or may be virtual processors. Virtual processors may be run within virtual machines, which may include a guest OS, guest memory, virtual memory devices ("VMD"), and virtual input/output devices ("VI/O").

Figure 2:
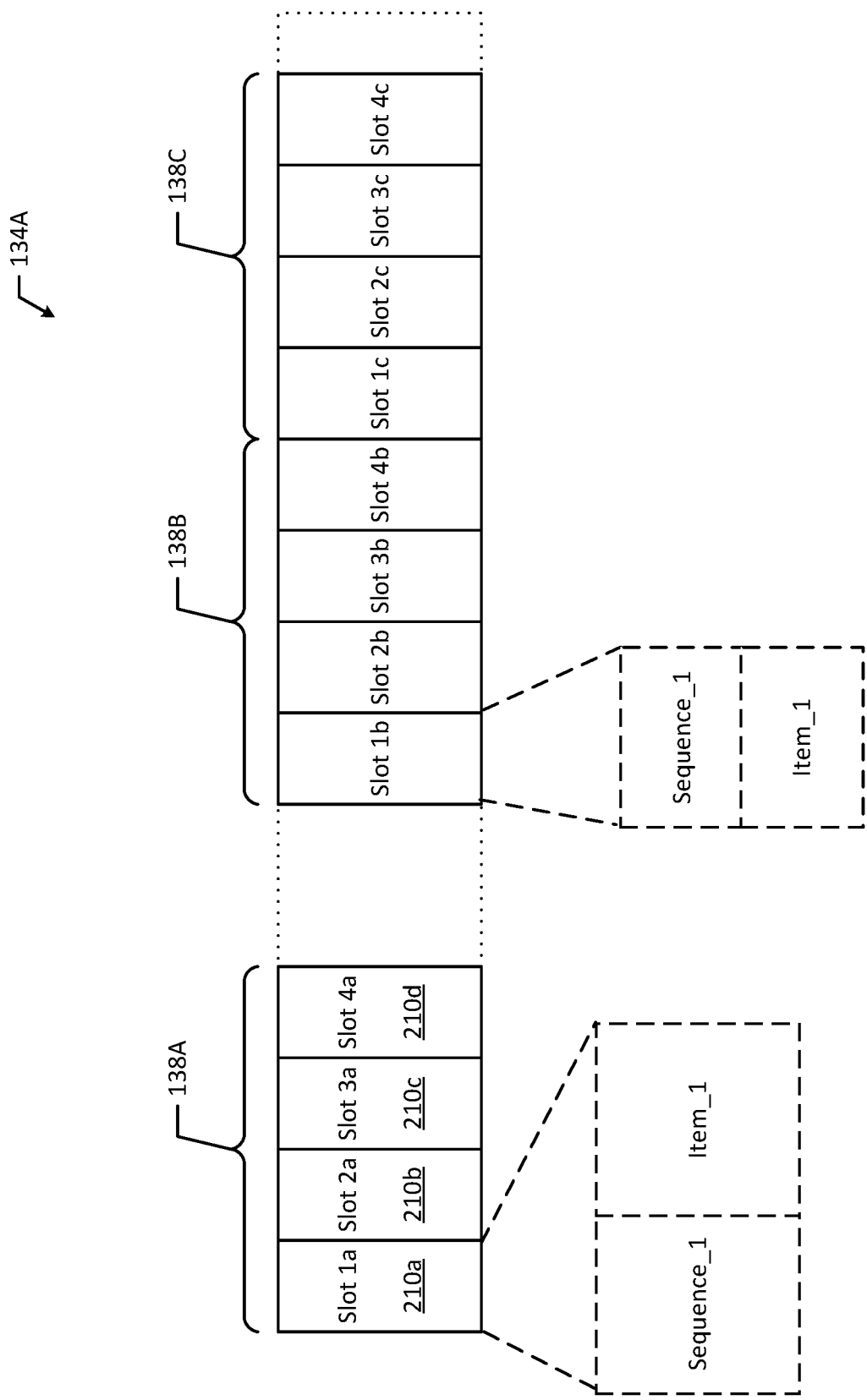
FIG. 2 illustrates a block diagram of an example pool or doubly linked list of memory chunks according to an example embodiment of the present disclosure.

The computer system 100A may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Consumer processor(s) 124A-B and producer processor(s) 128A-B may be cores of CPU(s) 120A-D. Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Additionally, if the consumer processor(s) 124A-B and producer processor(s) are virtual processors (e.g., virtual CPUs), they may be provisioned on the same host or node (e.g., node 110A) or different nodes. For example, a consumer processor (e.g., consumer processor 124A) may be associated with its own respective physical processor (e.g., physical CPUs 120A of node 110A). In another example, virtual processors may be assigned to the same physical processor or CPU. Additionally, virtual processors may be assigned to different cores on the same physical processor. FIG. 2 depicts a high-level component diagram of an example portion of memory 134A, which includes memory chunks 138A-C. Each memory chunk may include a plurality of slots. For example, memory chunk 138A may include slots 210*a-d* (e.g., "Slot 1a", "Slot 2a", "Slot 3a", and "Slot 4a"). Each slot may be 4 bytes, 8 bytes, etc. Additionally, a memory chunk may occupy multiple cache-lines such as two cache-lines.

The memory chunks may be connected to form a continuous region of memory (e.g., memory chunks 138B and 138C). Additionally, a memory chunks may be disconnected or divided from other memory chunks in other regions of the memory 134A. For example, memory chunk 138A is disconnected from memory chunk 138B. As illustrated in FIG. 2, the plurality of slots (e.g., slots 210*a-d*) may be arranged in an array. Each memory chunk has a chunk size, which may be a fixed value. In the illustrated example, each memory chunk 138A-C has four slots, but memory chunks 138 may include additional slots (e.g., 6 slots, 10 slots, 32 slots, etc.). An entire memory chunk 138 may have a chunk size of 1024 bytes. In an example, a NULL value may be stored in a slot to indicate that the slot is empty or that the slot is being consumed.

For each slot position (e.g., slots 210*a-d*) in a memory chunk (e.g., memory chunk 138A) there is an epoch sequence number, which may be sized as the chunk ID (e.g., 8 bytes or 64 bits), and the epoch sequence number may be configured to indicate a state of the item the epoch sequence number refers to. A memory chunk (e.g., memory chunk 138A) with four slots may have four distinct epoch sequence values. Similarly, a memory chunk with eight slots may have eight distinct epoch sequence values. As used herein, epoch sequence values may be referred to generally as sequence values.

The sequence values may be located singularly near (e.g., before or after) each slot the sequence values refer to on the memory chunk. The location of the sequence values may use the correct alignment requirements to allow safe atomic updates and safe atomic reads of slot values or sequence values separately. For example, as illustrated in Slot 1a, each slot may have a sequence value associated with it that is positioned before the item in the sequence. As illustrated in FIG. 2, "slot 1a" may be associated with a sequence value (e.g., "Sequence_1") and an element value (e.g., "Element_1") and may store an item. Similarly, "slot 2a" may be associated with a sequence value (e.g., "Sequence_2") and an element value (e.g., "Element_2") and may store another item and so on. As mentioned above, the sequence value may also be located after item in the memory chunk 138A.

In another example, the sequence value may be packed in a separate array in the memory chunk itself. For example, the sequence value may be packed in a separate array that is separated from the portion of the memory chunk where the element values are stored. Specifically, the memory chunk (e.g., memory chunk 138B) may include a sequence value portion and an element value portion. As illustrated in FIG. 2, "slot 1b" may include a sequence portion and an element portion that indicates that "slot 1b" is associated with "Sequence_1" and "Element_1". Similarly, "slot 2b" may be associated with "Sequence_2" and "Element_2", "slot 3b" may be associated with "Sequence_3" and "Element_3", and "slot 4b" may be associated with "Sequence_4" and "Element_4".

In either of the above examples, the sequence value portion of a slot may be 8 bytes long while the element value portion of the slot may depend on the size of the item stored (e.g., 32 bits or 64 bits). In both examples, a slot (e.g., slot 210*a*) contains the sequence value (e.g., "Sequence_1") relative to the element value (e.g., "Element_1"), which may contain the first item in the memory chunk 138A. If a memory chunk is non-recyclable, the items may be stored in slots without associating each slot with a sequence value. In other examples, the sequence value and the element value or item value may start at "0", for example, "slot 1a" may be associated with "Sequence_0" and "Element_0" or "Item_0."

As illustrated in FIG. 2, multiple memory chunks (e.g., chunk 138A-C) may create a memory pool. In an example, the pool may include between 2 and 100 memory chunks. In other examples, the pool may typically include approximately 10 memory chunks. The memory chunks (e.g., chunk 138A-C) may be on a single memory device (e.g., MD 130A). Alternatively, the memory chunks (e.g., chunks 138A-C) may be distributed over several memory devices (e.g., MD 130A-B). A memory chunk may be referred to as an atomic chunk, which may be identified by an array of item slots with a capacity, an identifier (e.g., Chunk ID) and that points to other memory chunks. For example, the array may be defined as "AtomicChunk (chunk_id, chunk_capacity, prev: Atomic Chunk, next: AtomicChunk)." Operations that may be performed on a memory chunk (e.g., chunk 138A-C) include changing to the previous memory chunk or next memory chunk, loading a value into an index position of the array of slots belonging to the memory chunk (e.g., load(index)), and storing a value into the index position of the array of slots belonging to the memory chunk (e.g., store(index, p)).

As described in more detail below, the producer processor(s) 128A-B or associated processor threads (e.g., P_threads 160A-E) may receive offer requests to produce items such as packet addresses. A producer sequence may represent the offer identity of an offer request. Specifically, the producer sequence may represent the identity of the offer and an identifier, such as a "Chunk_ID" may represent the identity of the memory chunk associated with a specific producer sequence. For example, the producer sequence may be implemented on a 64 bit counter. A buffer may point to the current memory chunk or atomic chunk. For example, a producer buffer (e.g., "ProducerBuffer") may be a pointer to the current memory chunk where the producer offers items. Additionally, a counter (e.g., "ProducerChunkId") may represent an identifier of the current producer buffer. Counter operations include loading (e.g., returning the value of the counter), storing a new value for the counter (e.g., store(new_value)), comparing and swapping (atomically) the value of the counter from an identified or expected value to the new value (e.g., C&S(expected, new_value)). The CAS instruction may fail if the starting value was not the identified or expected value. Additionally, the CAS instruction may fail if another producer thread (e.g., P_threads 160A-E) has successfully changed the value before the current CAS instruction completes. Additional counter operations include FAA instructions that obtain and increment (atomically) the value of the counter by a delta (e.g., F&A(delta)).

Similarly, the consumer side may have a consumer buffer (e.g., "ConsumerBuffer") and a consumer sequence ("ConsumerSequence"). The consumer buffer may be a pointer to the current memory chunk where the consumer processor(s) 124A-B or consumer threads (e.g., C_thread 150A-D) can poll the next item if the item is present. The consumer sequence may also be implemented on a 64 bit counter that represents an identifier of a consume request. A single producer and single consumer bounded queue that can hold a maximum of "N" free memory chunks may be defined as "FreeChunks (N):".

On the consumer side, a lock-free process may be used to mark each slot of the pooled chunks with an epoch sequence in order to coordinate access and operations performed by producers and consumers. For example, different consumers may proceed and consume items on the same memory chunk without waiting for another item to be fully consumed. Specifically, multiple items may be consumed concurrently by different consumer threads without using a lock. To coordinate these operations, a shared sequence may be used. Additionally, both a consumer sequence and a producer sequence may be used. To check the size of a queue, the difference between the producer sequence and the consumer sequence may identify the size of the queue. For example, items produced minus items consumed may result in the size of the queue. If the producer sequence and the consumer sequence are the same, then the queue is empty and each of the produced items have been consumed by the consumer threads.

By implementing a consumer sequence, the consumer threads may identify which memory chunk and which slot or item to attempt to read and consume. CAS operations allow the consumer sequence to move forward if there is a previously produced item to consume. After consuming the item, the consumer thread may write a "NULL" value into the corresponding slot. While one consumer thread is consuming an item, another consumer thread may continue after the consumer sequence is moved forward, which allows multiple consumer threads to read and consume items concurrently. For example, while one consumer thread is consuming an item, another consumer thread may perform another CAS operation and consume the next item before the previous item is "NULLED".

In an example configuration, each of the memory chunks may have the same chunk_capacity (e.g., chunk_capacity) and the "ProducerChunkID" may be initialized at a value of "0" and the "ProducerBuffer" may be set as (ProducerBuffer=AtomicChunk (chunk_id=0, chunk_capcity, prev=NULL, next=NULL) on initialization. Additionally, the "ConsumerBuffer" may be set as the "ProducerBuffer" on initialization and (FreeChunk(N)={AtomicChunk(chunk_id=-1, chunk_capacity, prev=NULL, next=NULL, . . . }.

Example operations include:

```
offer(element) {
    current_producer_seq = ProducerSequence.f&a(1);
    producer_buffer_index = current_producer_seq % chunk_capacity; //modulus operation
    producer_buffer_chunk_id = current_producer_seq / chunk_capacity; //division operation
    current_producer_buffer = ProducerBuffer;
    if (current_producer_buffer.chunk_id != producer_buffer_chunk_id) {
        current_producer_buffer = producer_buffer_of(current_producer_buffer, producer_buffer_chunk_id);
    }
    current_producer_buffer.store(producer_buffer_index, element);
}
where:
//walk or allocate chunks, if needed, until it get to the expected chunk id
producer_buffer_of(buffer, expected_chunk_id): AtomicChunk {
    jumps_backward = 0;
    while (true) {
        if (buffer == NULL) {
            buffer = ProducerBuffer;
        }
        chunk_id = buffer.chunk_id;
```

```
  if (chunk_id == -1) {
    //a consumer has already recycled buffer
    buffer = NULL;
    continue;
  }
  //how many chunks is necessary to walk backward from the current buffer to get to the
expected one?
  jumps_backward = chunk_id - expected_chunk_id;
  if (jumps_backward >= 0) {
    break;
  }
  //buffer cannot walk to the expected chunk id by moving forward, because
AtomicChunk.next is not stable;
  //the consumer could consume it during the chase
  //This producer thread try to allocate ANY missing chunk in order to walk backward (or
just stay still)
  if (chunk_id == ProducerChunkId) {
    //try to append the next missing one
    buffer = append_next_chunk(buffer, chunk_id);
  }
}
for (i = 0; i < jump_backward; i++) {
  //moving backward is fine: the consumer cannot proceed over expected chunk id
  //until the producer will occupy the buffer slot
  buffer = buffer.prev;
}
return buffer;
}
//try to append a new chunk or fail if others has succeeded
append_next_chunk(buffer, chunk_id): AtomicChunk {
  next_chunk_id = chunk_id + 1;
  if (!ProducerChunkIndex.c&s(chunk_id, next_chunk_id) {
    return NULL;
  }
  new_chunk = FreeChunks.poll( );
  if (new_chunk != NULL) {
    //new_chunk.chunk_id is -1
    ProducerBuffer = new_chunk;
    new_chunk.prev = buffer;
    //It makes:
    //- incoming producers able to succeed if they need to offer on next_chunk_id
    //- stalled producers to jump backward, if needed
    //- appending producers to attempt to append a new chunk
    new_chunk.chunk_id = next_chunk_id;
  } else {
    new_chunk = AtomicChunk(chunk_id = next_chunk, chunk_capacity, prev = buffer,
next = NULL);
    //It makes:
    //- incoming producers able to succeed if they need to offer on next_chunk_id
    //- stalled producers to jump backward, if needed
    //- appending producers to attempt to append a new chunk
    ProducerBuffer = new_chunk;
  }
  //it enables a consumer to finish consuming buffer (and maybe recycle it)
  buffer.next = new_chunk;
}
```

Figure 3A:
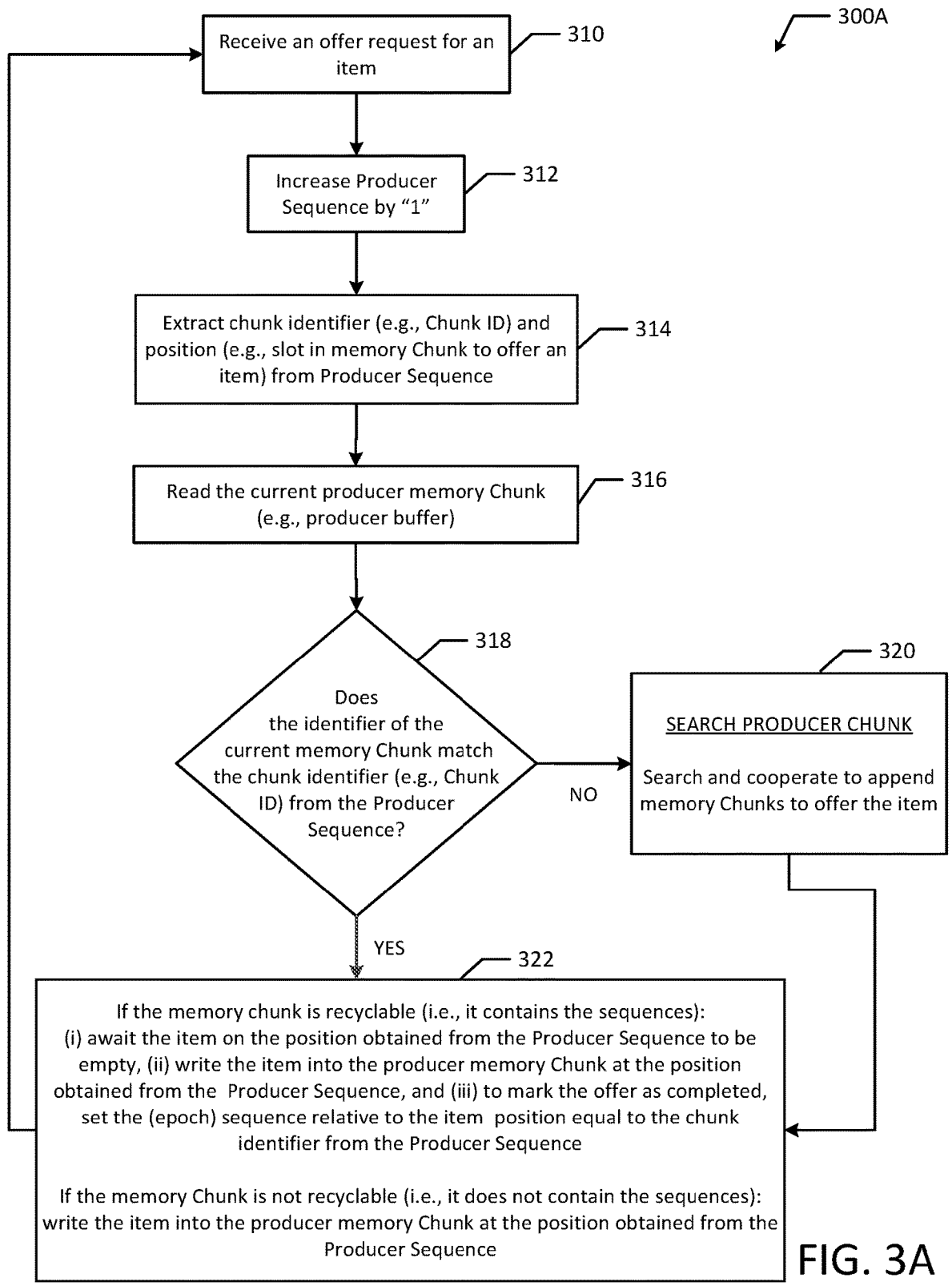
FIGS. 3A, 3B and 3C illustrate a flowchart of an example process for processing an offer request in a progressive chunked queue according to an example embodiment of the present disclosure.
Figure 3B:
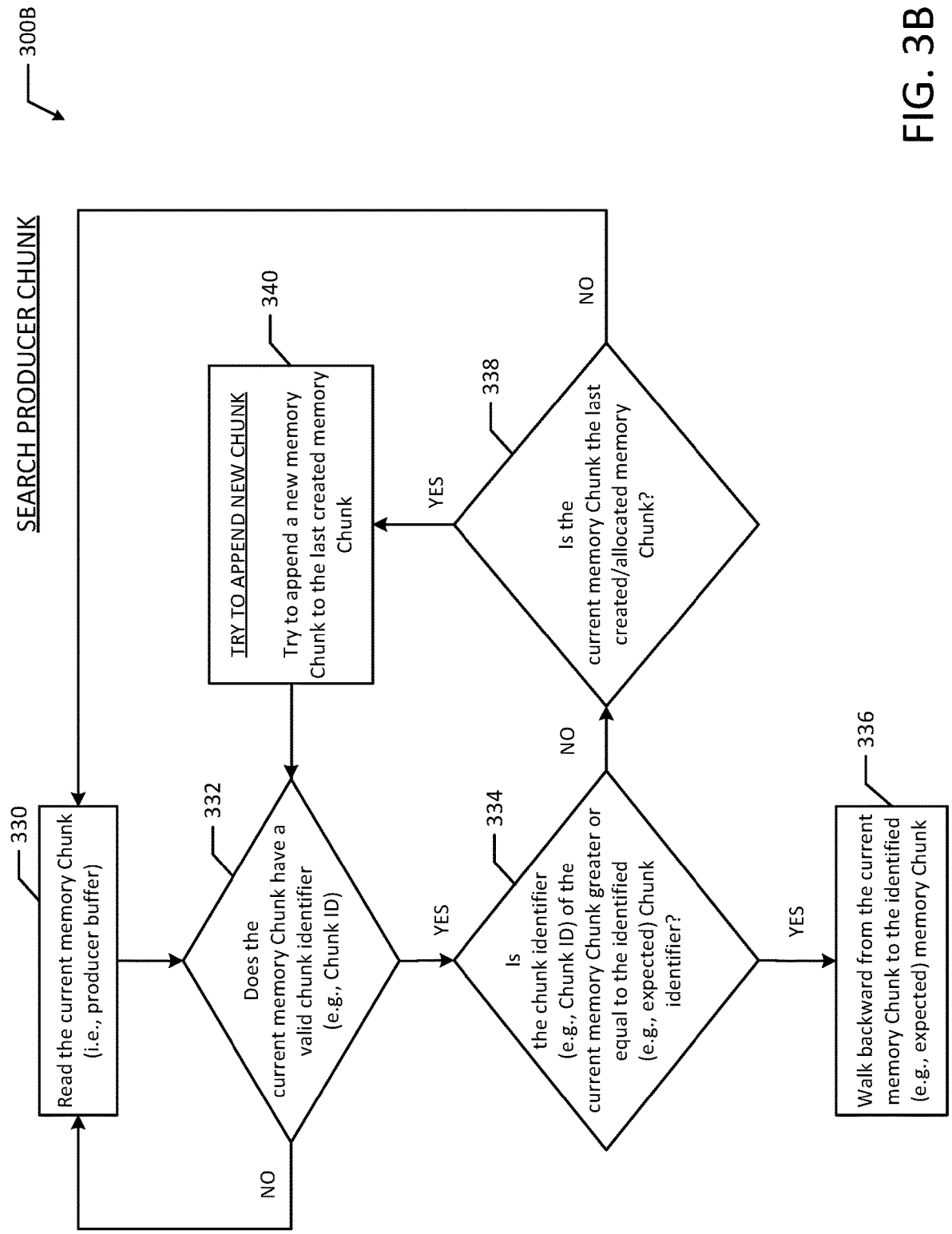
Figure 3C:
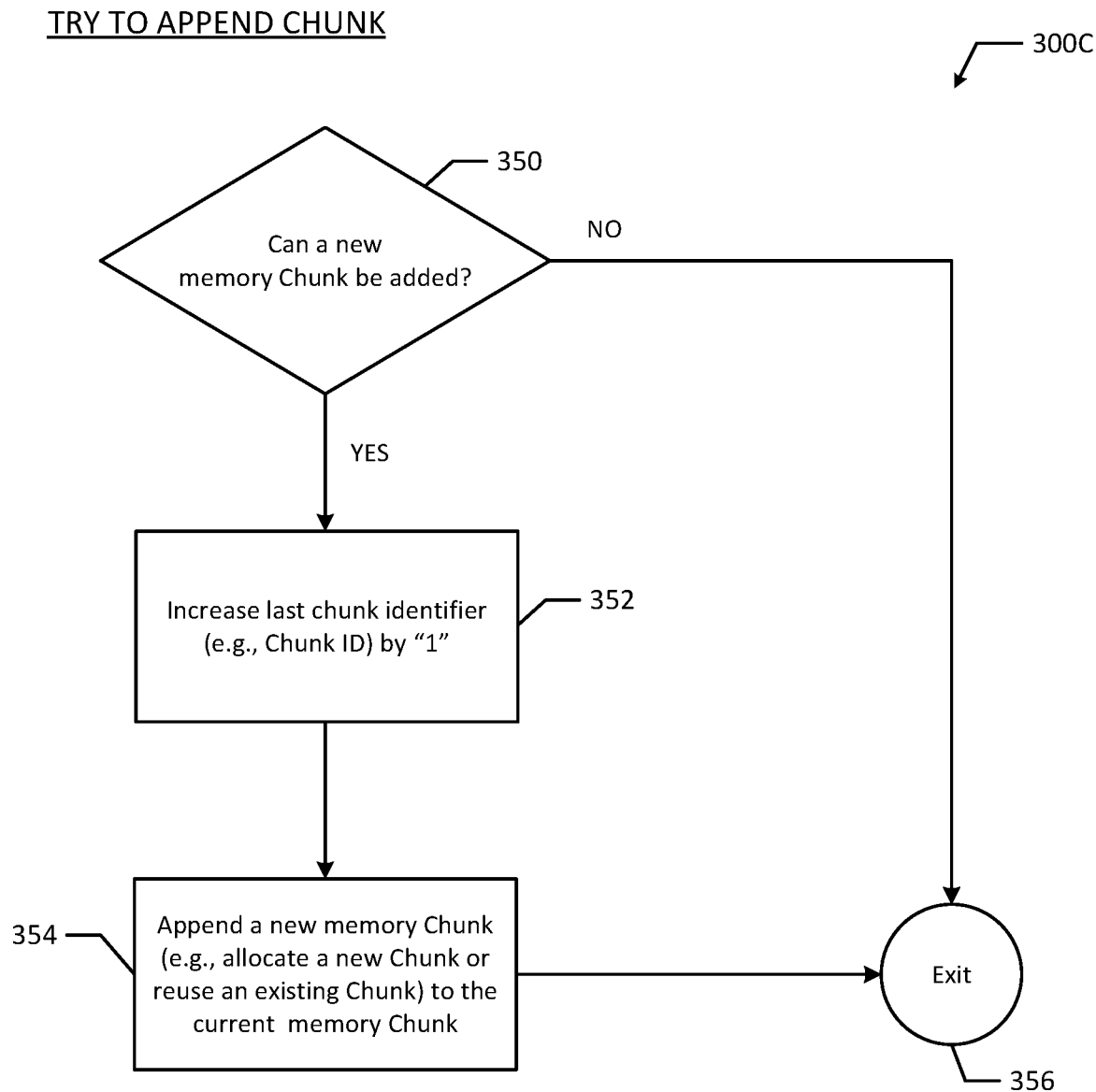

FIGS. 3A, 3B and 3C illustrate a flowchart for processing an offer request in a progressive chunked queue. As illustrated in FIG. 3A, a producer thread (e.g., producer thread 160A of producer processor 128A), hereinafter referred to generally as producer thread 160, may receive an offer request for an item (block 310). For example, the offer request may be associated with an item such as a packet address. Responsive to receiving the offer request, the producer thread 160 may increase a producer sequence by "1" (block 312). For example, producer sequence may be a counter that identifies an offer request. The producer sequence or counters may be incremented and decremented by the producer processor(s) 128A-B or producer threads (e.g., P_threads 160A-E). Additionally, the sequence may be an integer, such as a 64 bit integer or counter that represents the identifier of an offer request. If the chunk size of a memory chunk (e.g., chunk 138A) is a fixed value, the chunk identifier (e.g., chunk ID) may be obtained by dividing the producer sequence by the chunk size (e.g., Chunk_ID=sequence/chunk size). Similarly, the offset or position in the memory chunk may be determined by the modulo operation (e.g., modulus) between the sequence and the chunk size.

The producer thread 160 may increase the producer sequence by a value, such as an integer value (e.g., an integer value of "1" as illustrated in FIG. 3A). Then, the producer thread 160 may extract a chunk identifier (e.g., a Chunk ID) and a position (e.g., the slot in a memory chunk 138 to offer the item) from the producer sequence (block 314).

Then, the producer thread 160 may read the current memory chunk (e.g., read the current producer memory chunk or producer buffer) (block 316) to determine whether the identifier of the current memory chunk matches the chunk identifier (e.g., Chunk ID) obtained from the producer sequence (block 318). As described above, the producer buffer may point to the current memory chunk or atomic chunk. For example, the producer buffer may be a pointer to the current memory chunk where the producer offers items. If the identifier of the current memory chunk does not match the chunk identifier (e.g., Chunk ID) obtained from the sequence, the producer thread 160 may search and cooperate to append a memory chunk(s) to offer the item (block 320), which is described in more detail in FIG. 3B. The appending memory chunk may be a new memory chunk (e.g., chunk 138D) or may be a memory chunk that was previously allocated to the pool of memory chunks (e.g., chunk 138C) or doubly linked list of memory chunks. If the producer memory chunk is recyclable (i.e., the producer memory chunk contains the sequences), then the producer thread 160 may await the item on the position obtained from the producer sequence to be empty (e.g., await for the slot to be consumed). The producer thread 160 may also write the item in to the memory chunk at the position obtained from the producer sequence and then mark the offer as completed (block 322). For example, the producer thread 160 may set the epoch sequence relative to the item position equal to the chunk identifier (e.g., Chunk ID) from the producer sequence.

If the memory chunk is not recyclable (i.e., the producer memory chunk does not contain the sequences), the producer thread 160 may write the item into the memory chunk at the position obtained from the producer sequence (block 322). For example, the producer thread 160 may write the packet address at the identified slot position in the producer memory chunk. After producing or writing the packet address, the producer thread 160 may wait for another request. After receiving another offer request for an item, the producer thread or another producer thread 150 may again perform method 300A at block 310.

FIG. 3B illustrates a flowchart of method 300B, which illustrates searching and appending a memory chunk according to block 320 of FIG. 3A. For example, when searching for a memory chunk, the producer thread 160 may read the current memory chunk (e.g., read the current producer memory chunk or producer buffer) (block 330). Then, the producer thread may determine whether the current memory chunk has a valid identifier (e.g., Chunk ID) (block 332). If the if the current memory chunk does not have a valid identifier (e.g., Chunk ID), then the producer thread may attempt to read the current memory chunk again. If the memory chunk does have a valid identifier, the producer thread 160 may determine if the identifier (e.g., Chunk ID) of the current memory chunk is greater or equal to the identifier of the identified memory chunk (block 334). If the identifiers are equal, then the current memory chunk is the same memory chunk identified by the offer request.

Specifically, the producer thread 160 may determine if the identifier of the current memory chunk is greater than or equal to the identifier of the memory chunk identified in the offer request. If the identifier of the current memory chunk is greater than the identified memory chunk identifier, then the producer thread 160 may walk backwards from the current memory chunk to the identified memory chunk (block 336). For example, the producer thread 160 may walk back from a memory chunk with a "Chunk ID=2" to a memory chunk with a "Chunk ID=1." After walking backward from the current memory chunk to the identified (e.g., expected) memory chunk, the producer thread 160 may then write the item into the producer memory chunk at the position identified by the sequence as illustrated at block 322 of FIG. 3A. If the identifier of the current memory chunk is equal to the identified memory chunk identifier, the producer thread 160 may stay stationary (e.g., walk backwards zero jumps or spots).

If the identifier (e.g., Chunk ID) of the current memory chunk is not greater than or equal to the identified chunk identifier, then the producer thread 160 may determine whether the current memory chunk is the last created or allocated memory chunk (block 338). For example, the producer thread 160 may determine if the current producer memory chunk was created or allocated most recently for the memory chunk pool. If the current producer memory chunk was not the last created or allocated, then the producer thread 160 may attempt to read the current producer memory chunk again (block 330). In some instances, the current producer memory chunk may have changed.

If the current producer memory chunk was the last created or allocated memory chunk, then the producer thread 160 may try to append a new memory chunk to the last created memory chunk (e.g., the current producer memory chunk) (block 340), which is described in more detail in FIG. 3C. For illustrative purposes, if memory chunk 138B was the last created memory chunk, a new memory chunk (e.g., chunk 138C) may be appended as represented in the figure. After appending the new memory chunk, the method continues on to block 332 to determine if the newly appended memory chunk has a valid identifier (e.g., Chunk ID).

FIG. 3C illustrates a flowchart of method 300C, which illustrates trying to append a new memory chunk according to block 340 of FIG. 3B. For example, when trying to append a new memory chunk, the producer thread 160 may determine if a new memory chunk can be added (block 350). If a new memory chunk can be added, the producer thread 160 may increase the last chunk identifier (e.g., chunk ID) by "1" (block 352). Then, the producer thread 160 may append a new memory chunk (e.g., allocate a new memory chunk or reuse an existing memory chunk) to the current memory chunk (block 354). Then the producer thread 160 may exit (block 356) and return back to the flow diagram of method 300B as illustrated in FIG. 3B. If the producer thread 160 determines that a new memory chunk cannot be added, then the producer thread 160 may exit (block 356) and return back to the flow diagram of method 300B at block 332.

Figure 4A:
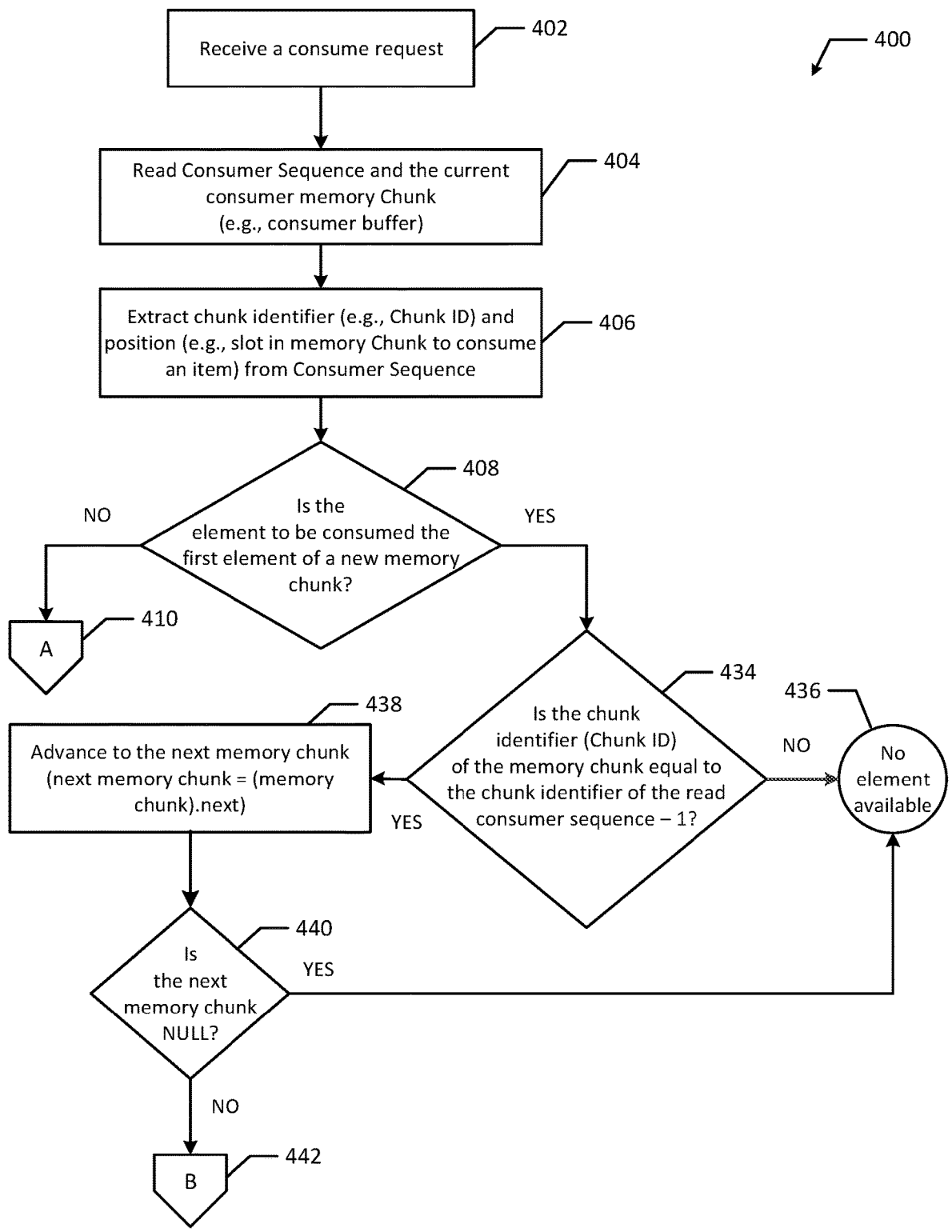
FIGS. 4A, 4B and 4C illustrate a flowchart of an example process for processing a consume request in a progressive chunked queue according to an example embodiment of the present disclosure.
Figure 4B:
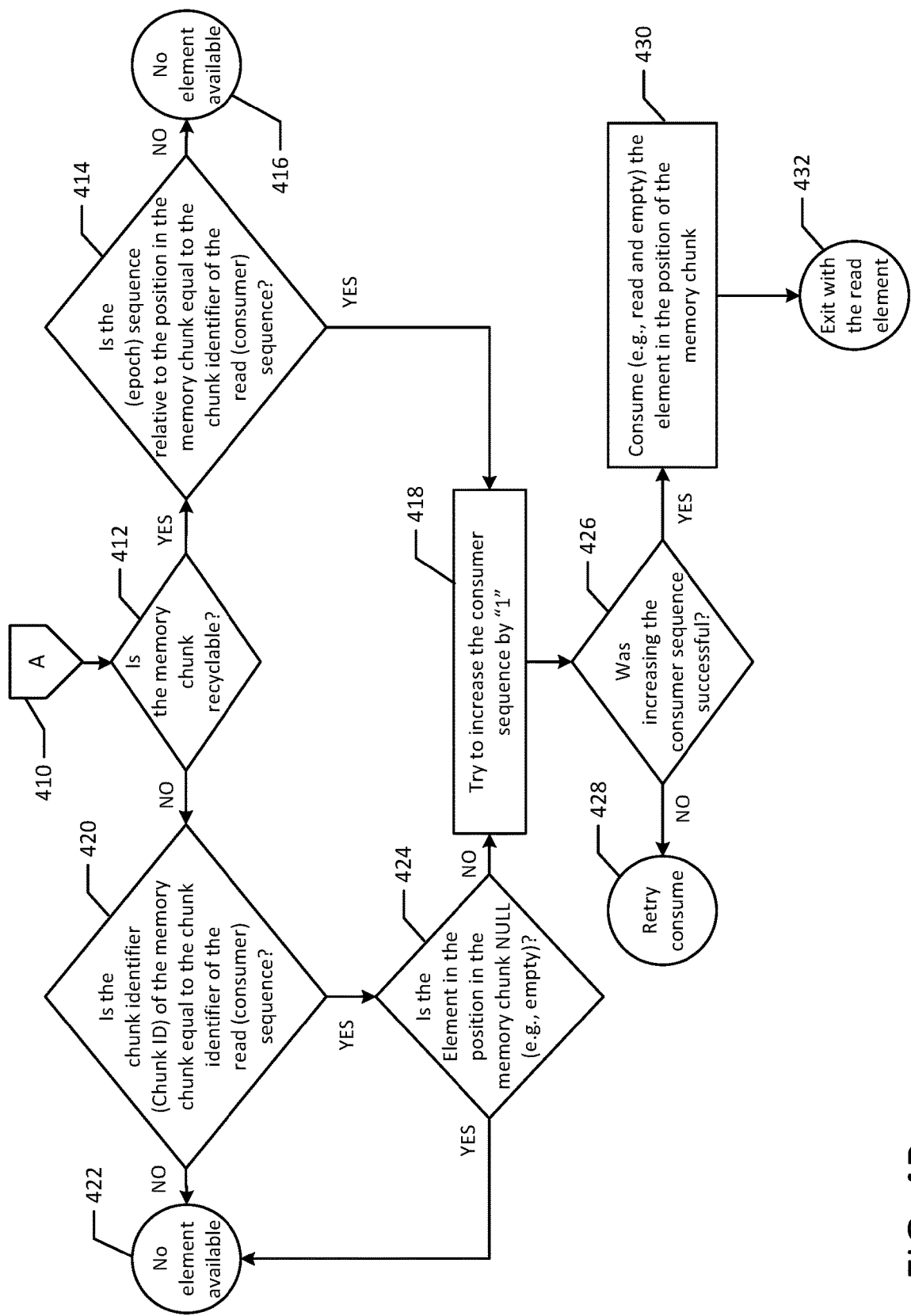
Figure 4C:
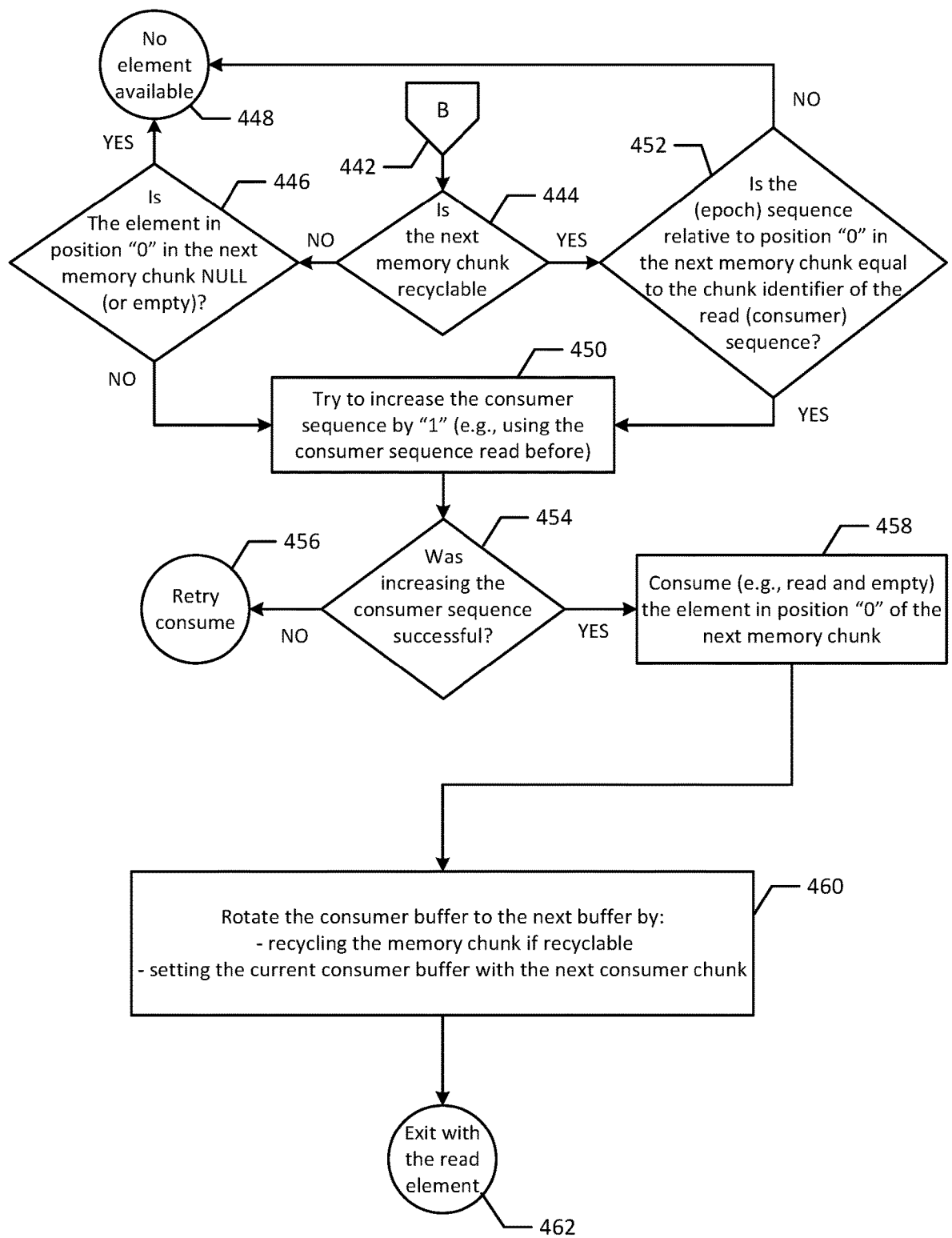

FIGS. 4A, 4B and 4C illustrate a flowchart for consuming an item in a progressive chunked queue. As illustrated in FIG. 4A, a consumer thread (e.g., consumer thread 150A of consumer processor 124A), hereinafter referred to generally as consumer thread 150, may receive a consume request (block 402). The consumer thread 150 may read a consumer sequence and may also read the current consumer memory chunk (e.g., consumer buffer) (block 404). The consumer buffer may be a pointer to the current memory chunk where the consumer processor(s) 124A-B or consumer threads (e.g., C_thread 150A-D) consume items.

Additionally, the consumer thread 150 may extract a chunk identifier (e.g., Chunk ID) and position (e.g., slot in a memory chunk) from the consumer sequence (block 406). Then, the consumer thread 150 may determine if the element to be consumed is the first element of a new memory chunk (block 408). If the element to be consumed is not the first element of a new memory chunk, method 400 continues at block 410, which is described in more detail in FIG. 4B. If the element is the first element in a new memory chunk, the consumer thread 150 may determine if the chunk identifier of the memory chunk is equal to the "chunk identifier of the read consumer sequence−1." (block 434). For example, the consumer thread 150 may reduce the consumer sequence by a value (e.g., reduce the consumer sequence by "1") and compare the reduced consumer sequence to the chunk identifier (e.g., Chunk ID). After reducing the consumer sequence, the consumer thread 150 may determine if the reduced consumer sequence matches the chunk identifier (e.g., Chunk ID). If the reduced consumer sequence matches the chunk identifier, the consumer thread 150 may advance to the next memory chunk (block 438). However, if the reduced consumer sequence and the chunk identifier (e.g., Chunk ID) mismatch, then the consumer thread 150 may exit as there may not be an item available to consume, for example, the consumer thread 150 may exit with a message "no element available." (block 436).

After advancing to or setting the next memory chunk, the consumer processor 150 may determine if the next memory chunk is NULL (block 440). If the next memory chunk is NULL, the consumer thread 150 may exit as there may not be an item available to consume, for example, the consumer thread 150 may exit with a message "no element available." (block 436). If the next memory chunk includes entries other than NULL entries, method 400 continues at block 442, which is described in more detail in FIG. 4C.

Referring back to block 410, method 400 continues at FIG. 4B and the consumer thread 150 determines if the memory chunk is recyclable (block 412). If the memory chunk is recyclable, then the consumer thread 150 may also determine if the epoch sequence relative to the position in the memory chunk is equal to the chunk identifier of the read consumer sequence (block 414). If the epoch sequence does not match to chunk identifier, then the consumer thread 150 may exit as there may not be an item available to consume, for example, the consumer thread 150 may exit with a message "no element available." (block 416). However, if the epoch sequence and the chunk identifier match, then the consumer thread 150 may try to increase the consumer sequence by a value (e.g., increase the consumer sequence by "1") (block 418).

Referring back to block 412, if the memory chunk is not recyclable, the consumer thread 150 may determine if the chunk identifier (e.g., Chunk ID) of the memory chunk is equal to the chunk identifier of the read consumer sequence (block 420). If the chunk identifier (e.g., Chunk ID) of the memory chunk and the chunk identifier of the read consumer sequence mismatch, then the consumer thread 150 may exit as there may not be an item available to consume, for example, the consumer thread 150 may exit with a message "no element available." (block 422). However, if the chunk identifier (e.g., Chunk ID) of the memory chunk and the chunk identifier of the read consumer sequence match, then the consumer thread 150 may determine if the element in the position in the memory is NULL (e.g., empty) (block 424). If the element in the slot position is NULL or empty, the consumer thread may exit as described above in block 422. If the slot position includes an element other than a NULL value, then the consumer thread 150 may try to increase the consumer sequence by a value (e.g., increase consumer sequence by "1") (block 418).

After attempting to increase the consumer sequence by "1", method 400 continues by determining if increasing the consumer sequence was successful (block 426). If increasing the consumer sequence was unsuccessful, the consumer thread 150 may retry consume the element (block 428). For example, the consumer thread 150 or consumer processor 124 may retry to consume the element by trying the process over as if starting back at block 402 as if the consume request was newly received. However, if increasing the consumer sequence is successful, the consumer thread 150 may consume the element in the position (e.g., slot position) of the memory chunk (block 430). For example, the consumer thread 150 may read the slot containing the element and set the slot to NULL or empty. The consumer thread 150 may set the slot to NULL or empty by overwriting the contents with a NULL value. Along with consuming the element at block 430, the consumer thread 150 may also try to increase the consumer sequence (e.g., using a CAS operation) to consume additional elements. In an example, other consumer threads 150 may also attempt to increase the consumer sequence to consume additional elements and multiple consumer threads 150 may consume items concurrently or in parallel. After the element is consumed, the consumer thread 150 may exit with the read element (block 432).

Referring back to block 442, if the next memory chunk includes values other than NULL values, method 400 continues by determining if the next memory chunk is recyclable (block 444). If the next memory chunk is not recyclable, the consumer thread 150 may determine if the element in position "0" in the next memory chunk is NULL or empty (block 446). For example, at block 440 the consumer processor 150 determined that the next memory chunk was not entirely NULL and now determines if the element in position "0" in the next memory chunks is NULL or empty. If the element in position "0" is NULL or empty, then the consumer thread 150 may exit as there may not be an item available to consume, for example, the consumer thread 150 may exit with a message "no element available." (block 448). However, if the element in position "0" has a value other than NULL or empty, then the consumer thread 150 may try to increase the consumer sequence by a value (e.g., increase the consumer sequence by "1" using the consumer sequence previously read by the consumer thread 150) (block 450).

Referring back to block 444, if the next memory chunk is recyclable, then the consumer thread 150 may determine if the epoch sequence relative to the position (e.g., position "0") in the next memory chunk is equal to the chunk identifier of the read consumer sequence (block 452). If the epoch sequence relative to position "0" in the next memory chunk and the chunk identifier mismatch, then the consumer thread may exit with a message "no element available" as described above at block 448. However, if the epoch sequence relative to position "0" in the next memory chunk and the chunk identifier match, then the consumer thread 150 may try to increase the consumer sequence by a value (e.g., increase the consumer sequence by "1" using the consumer sequence previously read by the consumer thread 150) as described above at block 450.

In an example implementation, the consumer thread 150 may determine if the epoch sequence relative to position "0" in the next memory chunk matches the chunk identifier of the read consumer sequence by determining if the following expression is true (e.g., memoryChunk.next.sequence[0], ChunkID(sequence)). In the expression above, ChunkID(x) extracts the chunk identifier of the sequence and the sequence is a variable that contains the last read consumer sequence. Additionally, "memoryChunk" is a variable that contains the last read consumer buffer. "memoryChunk.next" represents the next memory chunk and "x.seqeunce[0]" is the epoch sequence relative to the position "0" in a specific memory chunk (x).

After attempting to increase the consumer sequence by "1", method 400 continues by determining if increasing the consumer sequence was successful (block 454). If increasing the consumer sequence was unsuccessful, the consumer thread 150 may retry consume the element (block 456). For example, the consumer thread 150 or consumer processor 124 may retry to consume the element by trying the process over as if starting back at block 402 as if the consume request was newly received. However, if increasing the consumer sequence is successful, the consumer thread 150 may consume the element in the position (e.g., slot position "0") of the next memory chunk (block 458). For example, the consumer thread 150 may read the slot containing the element and set the slot to NULL or empty. The consumer thread 150 may set the slot to NULL or empty by overwriting the contents with a NULL value. Along with consuming the element at block 458, the consumer thread 150 may also try to increase the consumer sequence (e.g., using a CAS operation) to consume additional elements. In an example, other consumer threads 150 may also attempt to increase the consumer sequence to consume additional elements and multiple consumer threads 150 may consume items concurrently or in parallel.

After the element is consumed, the consumer thread 150 may rotate the consumer buffer to the next buffer (block 460). For example, the consumer thread 150 may recycle the memory chunk if the memory chunk is recyclable. Additionally, the consumer thread may set the current consumer buffer with the next consumer chunk. For example, the consumer thread 150 may recycle the consumer memory chunk and set the next memory chunk as the current consumer memory chunk (e.g., consumer buffer). Then, the consumer thread 150 may exit with the read element (block 462).

In the methods described above, exiting with "no item available" does not imply that the queue is empty. A consumer thread 150 may determine if a queue is empty by comparing the producer sequence and the consumer sequence. For example, to check the size of a queue or determine if the queue is empty, the difference between the producer sequence and the consumer sequence may be calculated. For example, items produced minus items consumed may result in the size of the queue. If the producer sequence and the consumer sequence are the same, then the queue is empty and each of the produced items have been consumed by the consumer threads 150. If the producer sequence and the consumer sequence are different, the consume process (e.g., method 300D) may be retired.

Figure 5A:
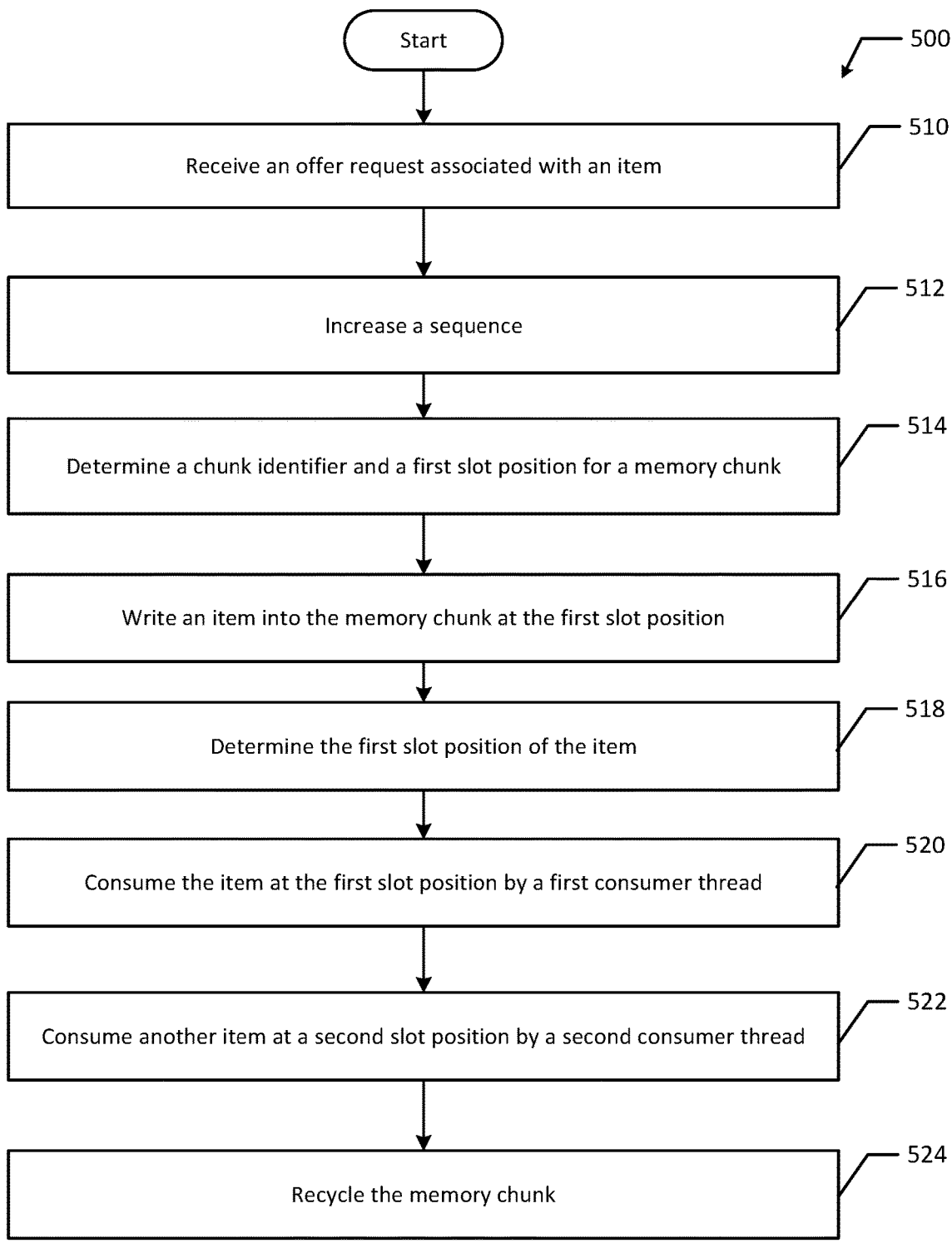
FIGS. 5A and 5B illustrate flowcharts of example processes for processing and consuming items according to example embodiments of the present disclosure.

FIG. 5A illustrates a flowchart of an example method 500 for processing and consuming items according to an example embodiment of the present disclosure. Although the example method 500 is described with reference to the flowchart illustrated in FIG. 5A, it will be appreciated that many other methods of performing the acts associated with the method 500 may be used. For example, the order of some of the blocks may be changed, certain blocks may be combined with other blocks, blocks may be repeated or iterated, and some of the blocks described are optional. The method 500 may be performed by processing logic that may comprise hardware (circuitry, dedicated logic, etc.), software, or a combination of both.

The example method 500 includes receiving an offer request associated with an item (block 510). For example, a producer thread 160A of a plurality of producer threads 160A-C may receive an offer request associated with an item. The offer request may be received from another processor, device or program (e.g., application). Then, the method 500 includes increasing a sequence (block 512). For example, responsive to receiving the offer request, the producer thread 160A may increase the sequence. The sequence, such as a producer sequence, may in an integer, such as a 64-bit integer. Additionally, the sequence may be associated with a chunk identifier that identifies the memory chunk for the request and a position that identifies the slot for producing the item.

Next, the method 500 includes determining a chunk identifier and a first slot position for a memory chunk (block 514). For example, the producer thread 160A may determine the chunk identifier (associated with the sequence) of a memory chunk from a pool of memory chunks. Additionally, the producer thread 160A may determine a first slot position (from the sequence) in the memory chunk to offer the item. The memory chunk may be an identified (e.g., expected) memory chunk. In an example, the producer thread 160A may extract the chunk identifier and position from the sequence. The producer thread 160A may also determine whether the chunk identifier is valid or invalid. A valid identifier may identify a memory chunk that is part of the memory chunk pool. For example, an identifier that identifies memory chunk 138E may be invalid for a memory chunk pool that includes memory chunks 138A-D.

The method includes writing an item into the memory chunk at the first slot position (block 516). For example, the producer thread 160A may write the item into the memory chunk at the first slot position. In an example, if the identifier is valid and the memory chunk matches the current memory chunk, then the producer thread 160A may write the item (e.g., packet address) at the position (e.g., first slot position) determined at block 514.

Method 500 also includes determining the first slot position of the item (block 518). For example, a consumer thread 150B of a plurality of consumer threads 150A-C may determine the first slot position (e.g., slot position of item produced by producer thread 160A). Then, the method includes consuming the item at the first slot position by a first consumer thread (block 520). For example, consumer thread 150B may consume the item at the first slot position. The consumer thread 150B of a consumer processor 124A may determine that the item was produced at the first slot position by using an item or message indicator. In an example, after an item is produced, the consumer thread 150B of a consumer processor 124A may receive a consume request. After determining that the item was newly produced or receiving a consume request, the consumer thread 150B may read a consumer sequence. Then, the consumer thread 150B may consume the item (e.g., read and copy the packet address). After consuming the item, the consumer thread 150B may overwrite the slot with a NULL value to indicate that the slot is empty. Additionally, the consumer thread 150B may perform other operations and determinations according to method 400 prior to, during, or after consuming the item at block 520.

Method 500 also includes consuming another item at a second slot position by a second consumer thread (block 522). For example, consumer thread 150A may consume another item at a second slot position in the memory chunk. Similar to consumer thread 150B, consumer thread 150A may consume the item (e.g., read and copy the packet address) and may overwrite the slot with a NULL value to indicate that the slot is empty. Similar to above, consumer thread 150A may consume the other item after receiving a consume request. The consumer thread 150A or other consumer threads 150B, 150C may continue to consume items in a memory chunk until each of the items or messages in the memory chunk are consumed.

Then, method 500 includes recycling the memory chunk (block 524). For example, the consumer thread 150A may recycle the memory chunk. A memory chunk may be recycled by appending the memory chunk to the pool of memory chunks such that the memory chunk can be reused. Prior to recycling the memory chunk, the consumer thread 150A may determine that the memory chunk is recyclable. In an example, each consumer thread 150A-C may be responsible for coordinating with each other to recycle memory chunks.

In other examples, if the item is not initially written into the identified memory chunk, after reading the current memory chunk, the producer thread 160A may either append a new memory chunk to the current memory chunk or walk backward from the current memory chunk to the identified (e.g., expected) memory chunk. Appending a new memory chunk may include appending a newly allocated memory chunk or may include appending a recycled memory chunk. For illustrative purposes, memory chunk 138D may be allocated to an existing memory chunk pool or doubly linked list that includes memory chunks 138A-C such that the pool now includes memory chunks 138A-D. Alternatively, appending a new memory chunk may include reusing a pooled memory chunk. For example, each slot in memory chunk 138A may have been entirely consumed and ready for reuse. In that instance, the memory chunk 138A may be rotated and reused.

The pool or doubly linked list of memory chunks forms an unbounded queue due to the ability of the producer thread 160 to append new memory chunks to the current memory chunk that represent the tail of the doubly linked list. The producer thread 160A-C may also walk between memory chunks, for example walk backwards from memory chunk 138C to memory chunk 138B. In order to favor locality and reduce the amount of memory allocated to the systems and methods described herein, the unbounded queue may reuse memory chunks. The queue of memory chunks may be stored in a thread-safe container that allows thread-safe access to the queue. The thread-safe container may be a data structure referred to as a free chunks pool.

Typically, for a single consumer thread (e.g., consumer thread 150A) implementation, memory chunks may be recycled after the consumer had fully consumed every element on the memory chunk. In an example with chunk size 4, where the producer sequence is at "5", the producer thread 160A may be unable to produce items by walking forward from the memory chunk associated with the producer sequence "1" or "0" because memory chunks prior to the memory chunk associated with producer sequence "5" are untrusted on the producer side. The producer thread 160A may not know how much progress the consumer thread 150 has made in the previous memory chunks and therefore cannot trust those memory chunks. However, the consumer thread 150A progresses based on newly produced items and consumes items in order. When a consumer thread 150A reaches the end of a memory chunk, the consumer thread 150A knows the memory chunk is empty and that it can be recycled for re-use.

Once the consumer thread 150A in a single consumer implementation confirms the memory chunk is empty and recycles the memory chunk, the producer thread 160A and other producer thread(s) 160B-C may try to append it to the end of the current memory chunk, if not already done by other concurrent producers. For example, the producer thread(s) 160A-C may append a new memory chunk, such as a recycled memory chunk, when the producer thread(s) 160A-C determine that the memory chunk is free and available to be immediately reused to hold new elements. In another example, the memory chunk may be recycled and others concurrent producers have already appended new memory chunks next to the one needed by the producer sequence "5". The producer thread 160A may walk or move backward into the recycled memory chunk.

However, in the multi-producer and multi-consumer implementation described herein, each element or item in the queue may be stored in a double linked list structure. In an example, each of the memory chunks are the nodes in the double linked list structure. The producers are responsible for appending new memory chunks, such as a recycled memory chunk. Additionally, the producers navigate backwards (if needed) to reach the memory chunk to produce a new item. In order to append a new memory chunk, the producer thread(s) 160A-C refer to the same memory chunk (e.g., by referring to a producer buffer) that represents the last appended memory chunk. For example, the last appended memory chunk is the tail of the doubly linked list.

Additionally, the consumers are responsible for consuming produced elements or items. The consumers also coordinate to recycle memory chunks. For example, each of the consumers refers to the same memory chunk (e.g., by referring to a consumer buffer) that represents the memory chunk containing the first item produced and not consumed (e.g., the head of the doubly linked list). Memory chunks that are recycled or allowed to be inserted in the free chunk pool contain additional information to coordinate producers and consumers using their slots.

Figure 5B:
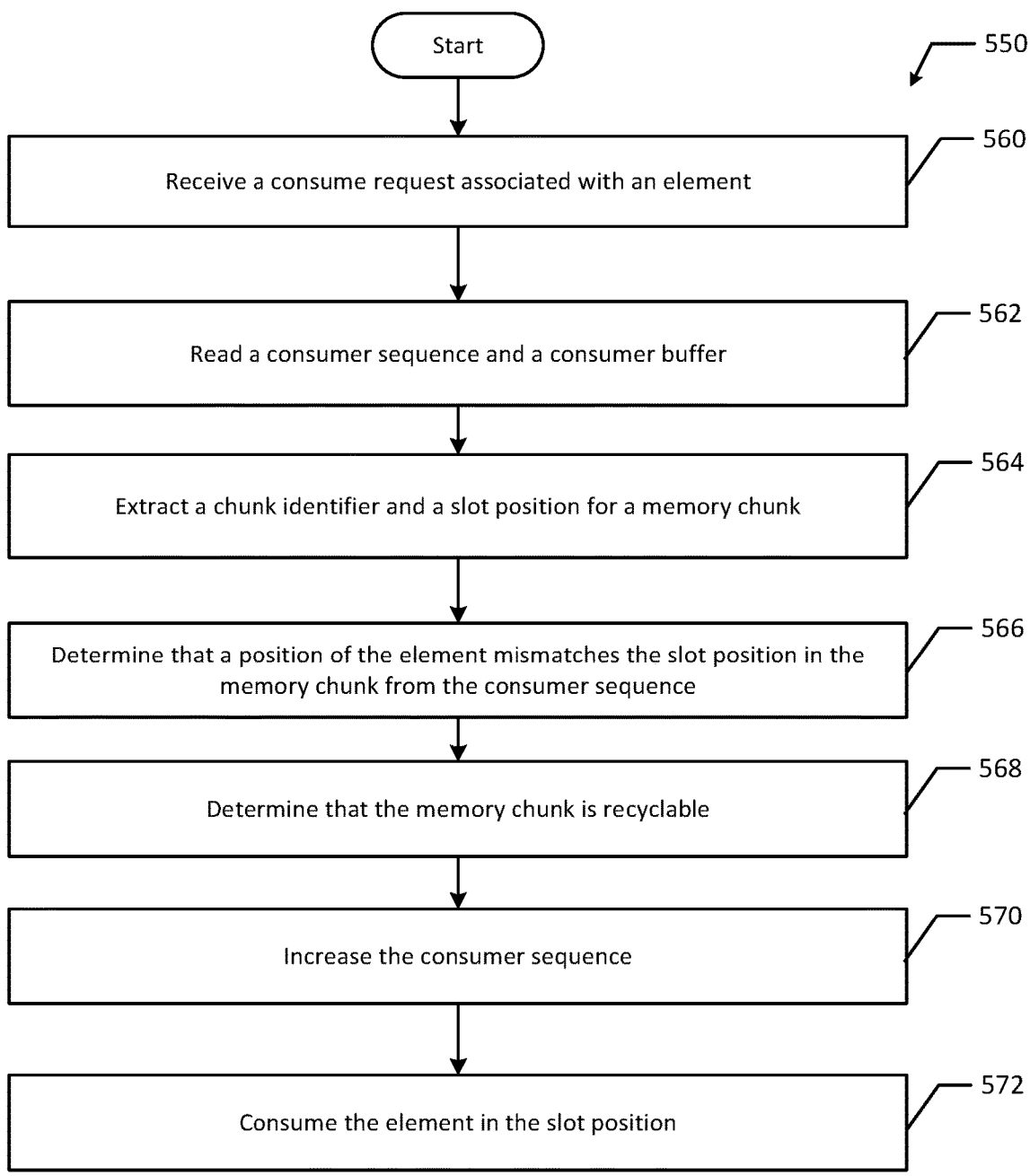

FIG. 5B illustrates a flowchart of an example method 550 for processing and consuming items according to an example embodiment of the present disclosure. Although the example method 550 is described with reference to the flowchart illustrated in FIG. 5B, it will be appreciated that many other methods of performing the acts associated with the method 550 may be used. For example, the order of some of the blocks may be changed, certain blocks may be combined with other blocks, blocks may be repeated or iterated, and some of the blocks described are optional. The method 550 may be performed by processing logic that may comprise hardware (circuitry, dedicated logic, etc.), software, or a combination of both.

The example method 550 includes receiving a consume request associated with an element (block 560). For example, a consumer thread 150A of a plurality of consumer threads 150A-C may receive a consume request associated with an item. The consume request may be received from another processor, device or program (e.g., application). Then, method 550 includes reading a consumer sequence and a consumer buffer (block 562). For example, the consumer thread 150A may read a consumer sequence and a consumer buffer.

After reading the consumer sequence and the consumer buffer, method 550 includes extracting a chunk identifier and a slot position in a memory chunk (block 564). For example, the consumer thread 150A may determine the chunk identifier (associated with the consumer sequence) of a memory chunk from a pool of memory chunks. Additionally, the consumer thread 150A may determine a slot position (from the sequence) in the memory chunk from the consumer sequence. The slot position may be the position of the element to be consumed. The consumer thread 150A may also determine whether the chunk identifier is valid or invalid. A valid identifier may identify a memory chunk that is part of the memory chunk pool. For example, an identifier that identifies memory chunk 138E may be invalid for a memory chunk pool that includes memory chunks 138A-D.

The method 550 includes determining that a position of the element mismatches the slot position in the memory chunk from the consumer sequence (block 556). For example, a consumer thread 150A of a plurality of consumer threads 150A-C may determine that the position of the element mismatches the slot position in the memory chunk from the read consumer sequence. Then, the method includes determining that the memory chunk is recyclable. For example, the consumer thread 150A may determine that the memory chunk is recyclable.

Then, method 550 includes increasing the consumer sequence (block 570). For example, the consumer thread 150A may increase the consumer sequence by a value (e.g., increase the consumer sequence by a value of "1"). The consumer thread 150A may increase the consumer sequence using the consumer sequence value read from block 562 above. Then, method 550 includes consuming the element in the slot position (bock 572). For example, the consumer thread 150A may consume the element (e.g., read and copy the packet address). After consuming the element, the consumer thread 150A may overwrite the slot with a NULL value to indicate that the slot is empty. Additionally, the consumer thread 150A may perform other operations and determinations according to method 400 to, during, or after consuming the item at block 570.

Figure 6A:
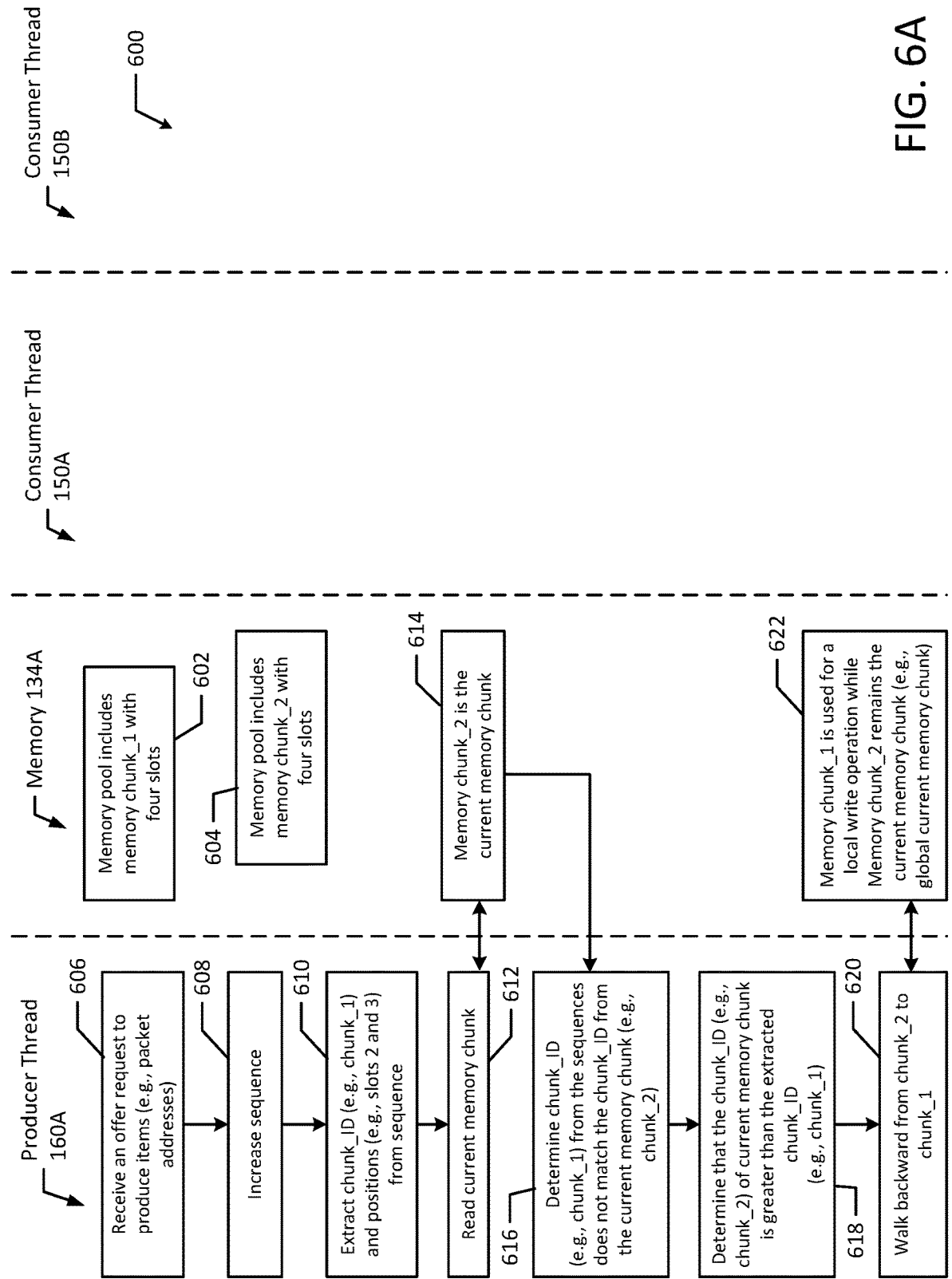
FIGS. 6A, 6B and 6C illustrate a flow diagram of an example process for processing and consuming offer requests in a progressive chunked queue according to an example embodiment of the present disclosure.
Figure 6B:
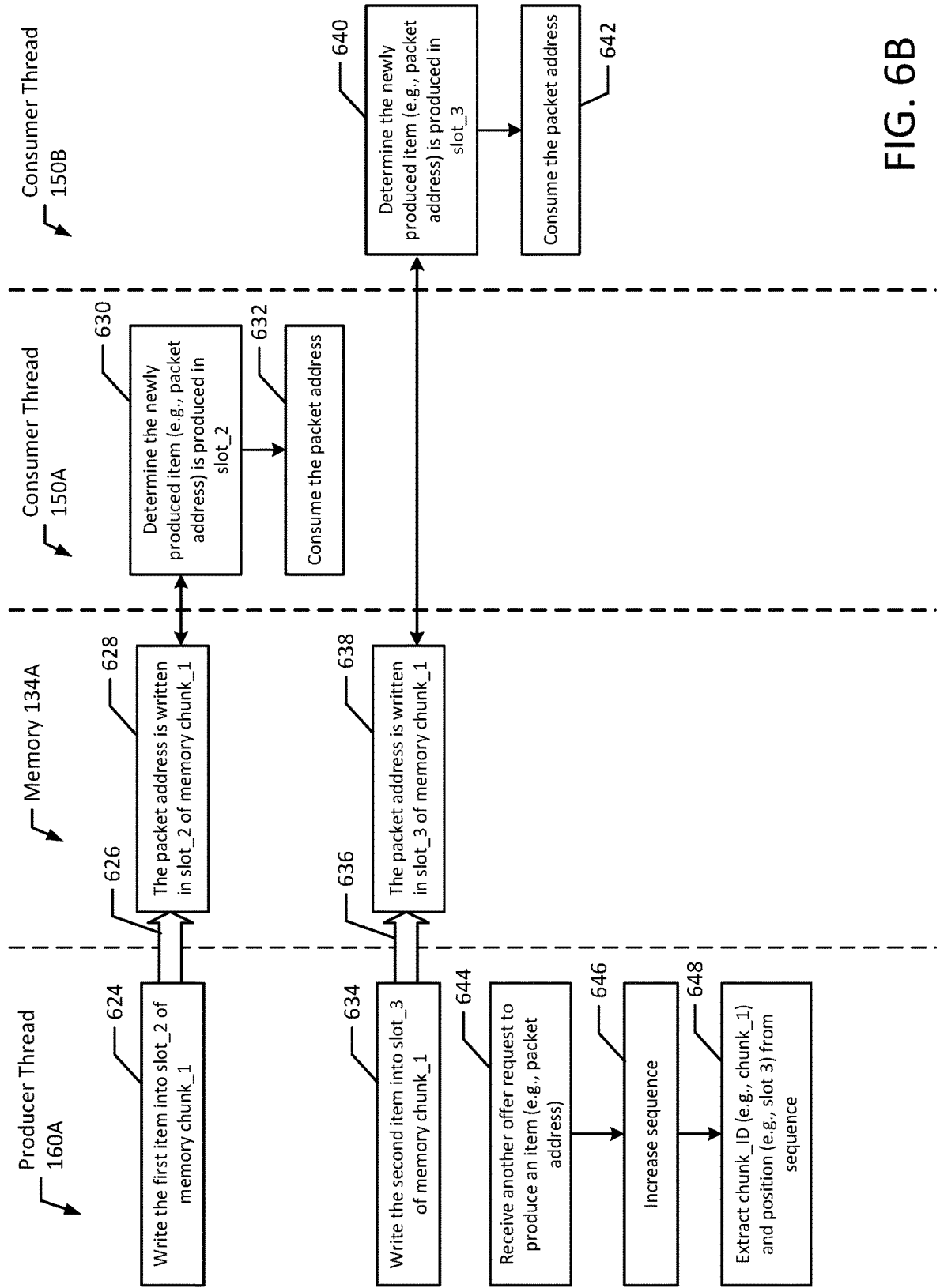
Figure 6C:
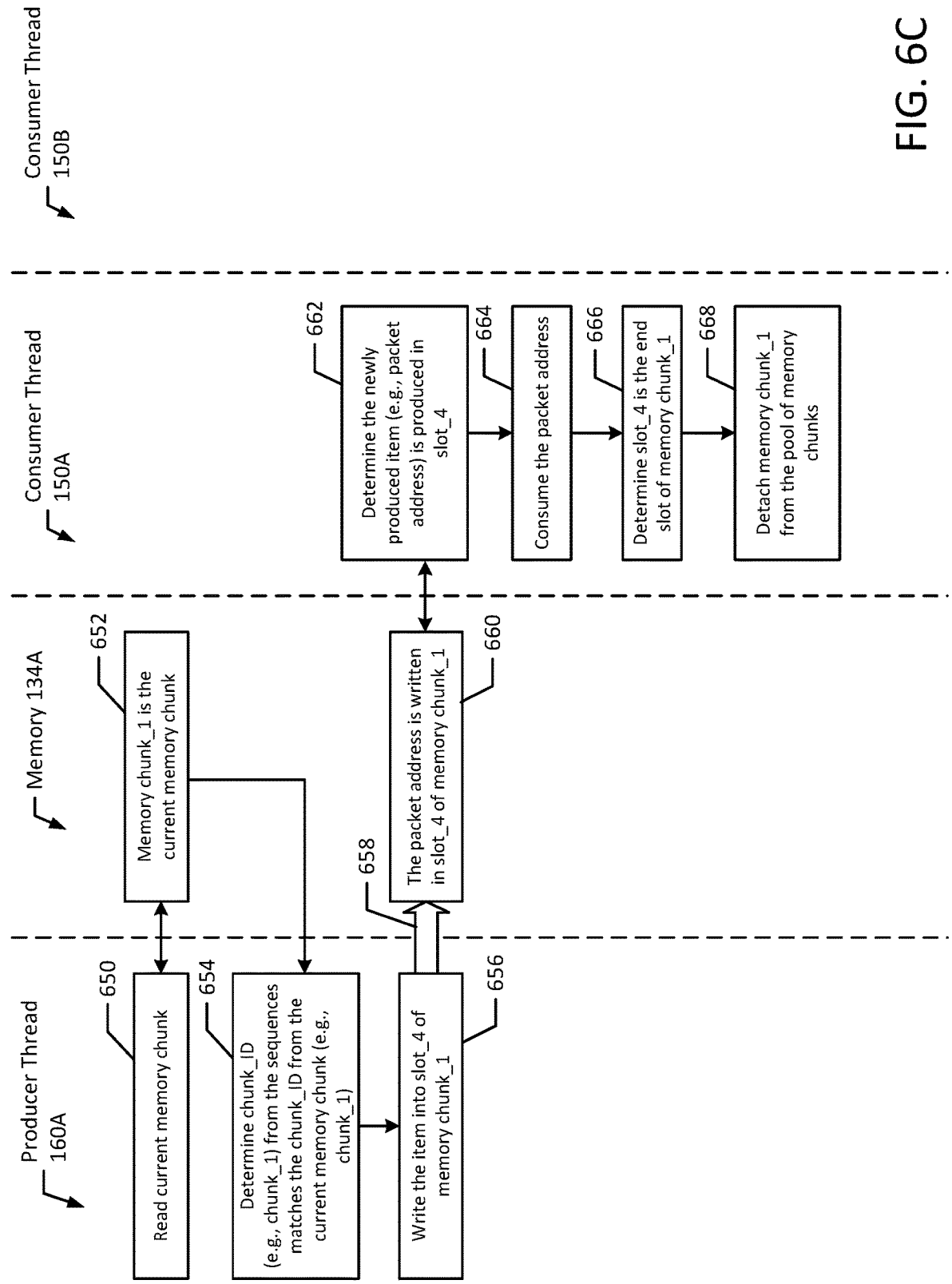

FIGS. 6A, 6B and 6C illustrate a flowchart of an example method 600 for processing and consuming offer requests in a progressive chunked queue accordance with an example embodiment of the present disclosure. Although the example method 600 is described with reference to the flowchart illustrated in FIGS. 6A, 6B and 6C, it will be appreciated that many other methods of performing the acts associated with the method 600 may be used. For example, the order of some of the blocks may be changed, certain blocks may be combined with other blocks, and some of the blocks described are optional. For example, a producer thread 160A and consumer threads 150A and 150B may communicate with memory 134A to perform example method 600.

In the illustrated example, the memory 134A or memory pool includes "memory chunk_1" (e.g., chunk 138A) with four slots (block 602) and "memory chunk_2" (e.g., chunk 138B) with four slots (block 604). Each slot may be 4 bytes, 8 bytes, etc. Additionally, a memory chunk may occupy multiple cache-lines such as two cache-lines. Typically, memory chunks that occupy more cache-lines result in less memory chunk rotations or CAS instructions. The producer thread 160A receives an offer request to produce an item (e.g., a packet address) (block 606). For example, the producer thread 160A of the producer processor 128A may receive an offer request to produce an item or message, however other producer threads 160B-C of producer processor 128A may also receive offer requests to produce items. After receiving the offer request, the producer thread 160A increases a sequence (block 608). The producer thread 160A may increase the sequence such as a producer sequence or producer counter.

Then, the producer thread 160A extracts a chunk ID (e.g., "chunk 1") and a position (e.g., "slot 2") from the sequence (block 610). The producer thread 160A also reads the current memory chunk (block 612). In the illustrated example, "memory chunk_2" (e.g., chunk 138B) is the current memory chunk (block 614).

Then, the producer thread 160A determines that the chunk ID (e.g., "chunk 1") form the sequence does not match the chunk ID from the current memory chunk (e.g., "chunk 2") (block 616). For example, the chunk ID from the sequence instead matches the chunk ID of "memory chunk_1", which is not the current memory chunk.

The producer thread 160A also determines that the chunk ID (e.g., "chunk 2") of the current memory chunk is greater than the extracted chunk ID (e.g., "chunk 1") (block 618). Because the chunk ID of the current memory chunk is greater than the extracted chunk ID, the producer thread 160A walks backward from "chunk 2" (e.g., chunk 138B) to "chunk 1" (e.g., chunk 138A) (block 620). Now, "memory chunk_1" is used for local write operations while "memory chunk_2" remains the current memory chunk (e.g., the global current memory chunk for other producers) (block 622). For example, after walking backward from "chunk 2" to "chunk 1", "chunk 1" may be used to write the item into it, but is not made the global current memory chunk for other producer processors and producer threads.

Continuing on FIG. 6B, the producer thread 160A writes the item 626 into "slot 2" of "memory chunk_1" (block 624). The item 626 may be a packet address or a message and may be written into "slot 2" by the producer thread 160A. The memory 124A or memory pool has the packet address associated with the offer request written into "slot 2" of "memory chunk_1" (block 628).

After the item 626 is written into a slot, the consumer thread 150A determines that the newly produced item 626 (e.g., packet address) is produced in "slot 2" (block 630). Then, the consumer thread 150A consumes the packet address (block 632). The consumer thread 150A may determine that the item was produced at the slot position by using an item indicator. After determining that the item was newly produced, the consumer processor 124B or consumer thread 150A may consume the item 626 (e.g., read and copy the packet address). After consuming the item 626, the consumer thread 150A may overwrite the slot with a NULL value to indicate that the slot is empty.

The producer thread also 160A writes a second item 636 into "slot 3" of "memory chunk_1" (block 634). Similar to item 626, the item 636 may be a packet address or a message and may be written into "slot 3" by the producer thread 160A. In an example, the producer thread 160A may write multiple items into the memory chunk concurrently or consecutively. The memory 124A or memory pool has the packet address associated with the offer request written into "slot 3" of "memory chunk_1" (block 638).

After the item 636 is written into a slot, another consumer thread 150B determines that the newly produced item 636 (e.g., packet address) is produced in "slot 3" (block 640). Then, the consumer thread 150B consumes the packet address (block 642). The consumer thread 150B may determine that the item was produced at the slot position by using an item indicator. After determining that the item was newly produced, the consumer processor 124B or consumer thread 150B may consume the item 636 (e.g., read and copy the packet address). After consuming the item 636, the consumer thread 150A may overwrite the slot with a NULL value to indicate that the slot is empty. As illustrated in FIG. 6B, both consumer threads 150A and 150B may concurrently consume items in slots. For example, consumer thread 150B may consume the item 636 in "slot 3" before consumer thread 150A has fully consumed the item 626 in "slot 2".

The producer thread 160A may receive another offer request to produce an item (e.g., a packet address) (block 644). After receiving the offer request, the producer thread 160A increases a sequence, such as a producer sequence (block 646), similar to block 608. Then, the producer thread 160A extracts a chunk ID (e.g., "chunk 1") and a position (e.g., "slot 3") from the sequence (block 648), similar to block 610.

Continuing on FIG. 6C, the producer thread 160A also reads the current memory chunk (block 650). In the illustrated example, "memory chunk_1" (e.g., chunk 138B) is now the current memory chunk (block 652). For example, "memory chunk_1" may be the current memory chunk for the producer processor 128A or producer thread 160A while another memory chunk is identified as the current global memory chunk for other producers.

Then, the producer thread 160A determines that the chunk ID (e.g., "chunk 1") form the sequence matches the chunk ID from the current memory chunk (e.g., "chunk 1") (block 644). After determining that the chunk ID from the current memory chunk (e.g., "chunk 1") matches the extracted chunk ID (e.g., "chunk 1") from the offer request, the producer thread 160A writes the item 658 into "slot 4" of "memory chunk 1" (e.g., chunk 138A) (block 656), similar to block 534.

The memory 124A or memory pool has the packet address associated with the offer request written into "slot 4" of "memory chunk_1" (block 660). After the item 658 is written into a slot, the consumer thread 150A determines that the newly produced item 658 (e.g., packet address) is produced in "slot 4" (block 662), similar to block 630. Then, the consumer thread 150A consumes the packet address (block 664), similar to block 632.

Additionally, the consumer thread 150A determines that "slot 4" is the end slot of "memory chunk 1" (block 666). The consumer processor 124A or consumer thread 150A may continue to consume items in a memory chunk until it reaches the end slot, which indicates that each of the items in "memory chunk 1" are consumed. In an example, the consumer processor 124A or consumer thread(s) 150A-C may periodically poll the memory chunk to determine if the memory chunk is empty, which advantageously allows the consumer thread(s) 150A-C to recognize when the memory chunk or pool of memory chunks (e.g., pool or doubly linked list of memory chunks forming the unbounded queue) is empty.

Because "slot 4" is the end slot, the consumer thread 150A detaches "memory chunk 1" from the pool of memory chunks (block 668). Once "memory chunk 1" is detached, it may be recycled for re-use so that the producer processor 128 or the producer thread(s) 160A-C can produce future items to the memory chunk. For example, the detached memory chunk may be appended to the end of the current memory chunk by the producer processor 128A if the producer processor 128A or producer thread(s) 160A-C reaches the end of the queue.

Figure 7:
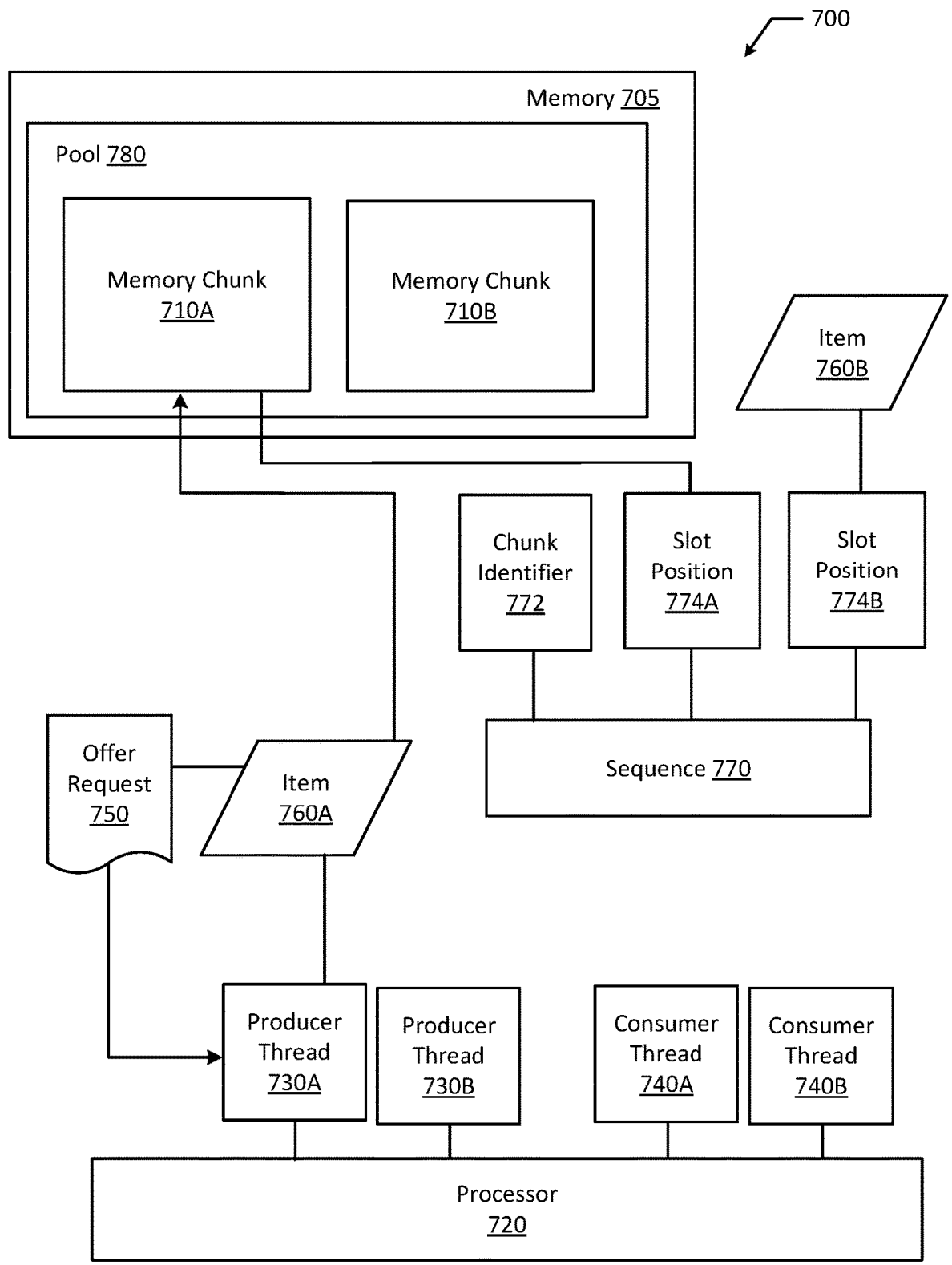
FIG. 7 illustrates a block diagram of an example multi-producer and multi-consumer progressive chunked queue system for processing offer requests according to an example embodiment of the present disclosure.

FIG. 7 is a block diagram of an example multi-producer and multi-consumer progressive chunked queue system 700 for processing offer requests according to an example embodiment of the present disclosure. The system 700 includes a memory 705 configured to store a plurality of memory chunks 710A-B. The system 700 also includes a processor 720 configured to execute a plurality of producer threads 730A-B and a plurality of consumer threads 740A-B. A producer thread 730A of the plurality of producer threads 730A-B is configured to receive an offer request 750 associated with an item 760A. Responsive to receiving the offer request 750, the producer thread 730A is configured to increase a sequence 770. The producer thread 730A is also configured to determine a chunk identifier 772, associated with the sequence 770, of a memory chunk 710A from a pool 780 of memory chunks 710A-B. Additionally, the producer thread 730A is configured to determine a first slot position 774A, from the sequence 770, in the memory chunk 710A to offer the item 760.

Additionally, the producer thread 730A is configured to write the item 760A into the memory chunk 710A at the first slot position 774A. A consumer thread 740A of the plurality of consumer threads 740A-B is configured to consume the item 760A at the first slot position 774A.

Another consumer thread 740B of the plurality of consumer threads 740A-B is configured to consume another item 760B at a second slot position 774B in the memory chunk 710A and recycle the memory chunk 710A. In an example, the consumer thread 740B may be configured to detach the memory chunk 710A to remove the memory chunk 710A from the pool 780 of memory chunks 710A-B before recycling and appending the memory chunk 710A to the pool 780 for reuse. Unlike other systems that use a single linked-list, for example a linked-list for concurrent ring queues ("CRQ"), the system 700 uses a pool 780 of memory chunks 710A-B. In an example, the pool 780 is a double linked-list of chunks. For example, a producer processor or producer thread 730B that is lagging behind may advantageously keep-up by reaching the chunk of memory (e.g., memory chunk 710B) that will host that producer processor's "yet-to-be-offered" items. For example, the producer processor or producer thread 730B may use the previous pointer from the last observed tail to navigate to a current chunk of memory (e.g., memory chunk 710B). Specifically, the moment at which a sequence 770 (e.g., producer sequence) is incremented, another producer (e.g., producer thread 730B) can move forward and the producer threads (e.g., producer threads 730A-B) have the ability to move or walk backwards to reach previous slots (e.g., slot identified by position 764 in memory chunk 710A).

Additionally, multiple consumer threads 740A-B may consume entries concurrently. The system 700 advantageously coordinates the access and operations of multiple producers and multiple consumers. For example, instead of each processor thread performing a CAS instruction, each of the processor threads (e.g., producer thread 730A-B) cooperate to reach an objective instead of competing with each other.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a method includes receiving, by a producer thread of a plurality of producer threads, an offer request associated with an item. Responsive to receiving the offer request, the method includes increasing, by the producer thread, a sequence. The method also includes determining, by the producer thread, (i) a chunk identifier, associated with the sequence, of a memory chunk from a pool of memory chunks and (ii) a first slot position, from the sequence, in the memory chunk to offer the item. Additionally, the method includes writing, by the producer thread, the item into the memory chunk at the first slot position. The method also includes determining, by a first consumer thread of a plurality of consumer threads, the first slot position of the item and consuming, by the first consumer thread, the item at the first slot position. Additionally, the method includes consuming, by a second consumer thread of the plurality of consumer threads, another item at a second slot position in the memory chunk and determining, by the second consumer thread, that the memory chunk is recyclable. The method also includes recycling, by the second consumer thread, the memory chunk.

In a 2nd exemplary aspect of the present disclosure, which may be used in combination with any one or more of the preceding aspects (e.g., the 1st aspect), the method further includes receiving, by the first consumer thread, a consume request prior to consuming the item at the first slot position and reading, by the first consumer thread, a consumer sequence. Additionally, the method includes reading, by the first consumer thread, a consumer buffer and determining, by the first consumer thread, (i) a second chunk identifier associated with the consumer sequence and (ii) a third slot position from the consumer sequence.

In a 3rd exemplary aspect of the present disclosure, which may be used in combination with any one or more of the preceding aspects (e.g., the 1st aspect), the method further includes writing, by the producer thread, additional items into the memory chunk after the memory chunk has been recycled.

In a 4th exemplary aspect of the present disclosure, which may be used in combination with any one or more of the preceding aspects (e.g., the 3rd aspect), the method further includes consuming, by the at least one of the first consumer thread and the second consumer thread, the additional items from the memory chunk.

In a 5th exemplary aspect of the present disclosure, which may be used in combination with any one or more of the preceding aspects (e.g., the 1st aspect), the method further includes updating, by the producer thread, the sequence responsive to writing the item into the memory chunk at the first slot position.

In a 6th exemplary aspect of the present disclosure, which may be used in combination with any one or more of the preceding aspects (e.g., the 5th aspect), the sequence is one of a consumer sequence and a producer sequence, and the sequence is configured to ensure a sequence of operations between the plurality of producer threads and the plurality of consumer threads is coordinated.

Aspects of the subject matter described herein may be useful alone or in combination with one or more other aspects described herein. In a 7th exemplary aspect of the present disclosure a system includes a memory configured to store a plurality of memory chunks and at least one processor configured to execute a plurality of producer threads and a plurality of consumer threads. A producer thread of the plurality of producer threads is configured to receive an offer request associated with an item, increase a sequence responsive to receiving the offer request and determine (i) a chunk identifier, associated with the sequence, of a memory chunk from a pool of memory chunks and (ii) a first slot position, from the sequence, in the memory chunk to offer the item. The producer thread is also configured to write the item into the memory chunk at the first slot position. A first consumer thread of the plurality of consumer threads is configured to consume the item at the first slot position. A second consumer thread of the plurality of consumer threads is configured to consume another item at a second slot position in the memory chunk, determine that the memory chunk is recyclable, and recycle the memory chunk.

In an 8th exemplary aspect of the present disclosure, which may be used in combination with any one or more of the preceding aspects (e.g., the 7th aspect), consuming the second slot includes writing a NULL value into the second slot.

In a 9th exemplary aspect of the present disclosure, which may be used in combination with any one or more of the preceding aspects (e.g., the 7th aspect), the memory chunk includes a plurality of slots.

In a 10th exemplary aspect of the present disclosure, which may be used in combination with any one or more of the preceding aspects (e.g., the 9th aspect), the plurality of slots is arranged in an array, and each slot of the plurality of slots is associated with a sequence value and an item value.

In an 11th exemplary aspect of the present disclosure, which may be used in combination with any one or more of the preceding aspects (e.g., the 9th aspect), the first consumer thread and the second consumer thread are configured to simultaneously consume respective slots of the plurality of slots.

In a 12th exemplary aspect of the present disclosure, which may be used in combination with any one or more of the preceding aspects (e.g., the 7th aspect), the sequence is a counter that identifies an offer request.

In a 13th exemplary aspect of the present disclosure, which may be used in combination with any one or more of the preceding aspects (e.g., the 7th aspect), the sequence is a producer sequence that is an array of 64-bit elements.

In a 14th exemplary aspect of the present disclosure, which may be used in combination with any one or more of the preceding aspects (e.g., the 7th aspect), at least one of the plurality of producer threads and the plurality of consumer threads is configured to reallocate the detached memory chunk back to the pool of memory chunks.

In a 15th exemplary aspect of the present disclosure, which may be used in combination with any one or more of the preceding aspects (e.g., the 7th aspect), the producer thread is configured to write additional items into the memory chunk.

In a 16th exemplary aspect of the present disclosure, which may be used in combination with any one or more of the preceding aspects (e.g., the 15th aspect), at least one of the first consumer thread and the second consumer thread are configured to consume the additional items from the memory chunk.

In a 17th exemplary aspect of the present disclosure, which may be used in combination with any one or more of the preceding aspects (e.g., the 7th aspect), the plurality of memory chunks forms an unbounded queue.

In an 18th exemplary aspect of the present disclosure, which may be used in combination with any one or more of the preceding aspects (e.g., the 7th aspect), the memory chunk occupies at least two cache-lines.

In a 19th exemplary aspect of the present disclosure, which may be used in combination with any one or more of the preceding aspects (e.g., the 7th aspect), the memory chunk has a chunk size, and the chunk size is a fixed value.

Aspects of the subject matter described herein may be useful alone or in combination with one or more other aspects described herein. In a 20th exemplary aspect of the present disclosure a non-transitory machine-readable medium stores code, which when executed by at least one processor is configured to receive, by a producer thread of a plurality of producer threads, an offer request associated with an item. Responsive to receiving the offer request, the non-transitory machine-readable medium is configured to increase, by the producer thread, a sequence and determine (i) a chunk identifier, associated with the sequence, of a memory chunk from a pool of memory chunks and (ii) a first slot position, from the sequence, in the memory chunk to offer the item. The non-transitory machine-readable medium is also configured to write, by the producer thread, the item into the memory chunk at the first slot position and determine, by a first consumer thread of a plurality of consumer threads, the first slot position of the item. Additionally, the non-transitory machine-readable medium is configured to consume, by the first consumer thread, the item at the first slot position and consume, by a second consumer thread of the plurality of consumer threads, another item at a second slot position in the memory chunk. The non-transitory machine-readable medium is also configured to determine, by the second consumer thread, that the memory chunk is recyclable and recycle, by the second consumer thread, the memory chunk.

Aspects of the subject matter described herein may be useful alone or in combination with one or more other aspects described herein. In a 21st exemplary aspect of the present disclosure a system includes a means for receiving an offer request associated with an item, a means for increasing a sequence, and first means for determining (i) a chunk identifier, associated with the sequence, of a memory chunk from a pool of memory chunks and (ii) a first slot position, from the sequence, in the memory chunk to offer the item. The system also includes a means for writing the item into the memory chunk at the first slot position, a second means for determining the first slot position of the item, and a first means for consuming the item at the first slot position. Additionally, the system includes a second means for consuming another item at a second slot position in the memory chunk, a third means for determining that the memory chunk is recyclable, and a means for recycling the memory chunk.

Aspects of the subject matter described herein may be useful alone or in combination with one or more other aspects described herein. In a 22nd exemplary aspect of the present disclosure a method includes receiving, by a consumer thread of a plurality of consumer threads, a consume request associated with an element and responsive to receiving the consume request, reading, by the consumer thread, a consumer sequence and a consumer buffer. The method also includes extracting, by the consumer thread, (i) a chunk identifier, associated with the consumer sequence and (ii) a slot position in a memory chunk from the consumer sequence. Additionally, the method includes determining, by the consumer thread, that a position of the element mismatches the slot position in the memory chunk from the consumer sequence and determining, by the consumer thread, that the memory chunk is recyclable. The method also includes increasing, by the consumer thread, the consumer sequence and consuming, by the consumer thread, the element at the slot position.

In a 23rd exemplary aspect of the present disclosure, which may be used in combination with any one or more of the preceding aspects (e.g., the 22nd aspect), the method further includes writing, by a producer thread, additional elements into the memory chunk.

In a 24th exemplary aspect of the present disclosure, which may be used in combination with any one or more of the preceding aspects (e.g., the 23rd aspect), the method further includes consuming, by the consumer thread and a different consumer thread, the additional elements from the memory chunk.

In a 25th exemplary aspect of the present disclosure, which may be used in combination with any one or more of the preceding aspects (e.g., the 22nd aspect), consuming the element includes writing a NULL value into the slot position.

In a 26th exemplary aspect of the present disclosure, which may be used in combination with any one or more of the preceding aspects (e.g., the 22nd aspect), the method further includes determining, by the consumer thread, that a second position of the element matches the slot position in the memory chunk from the consumer sequence. Additionally, the method includes reducing, by the consumer thread, the consumer sequence to a reduced consumer sequence and comparing, by the consumer thread, the reduced consumer sequence to the chunk identifier.

Aspects of the subject matter described herein may be useful alone or in combination with one or more other aspects described herein. In a 27th exemplary aspect of the present disclosure a system includes a memory configured to store a plurality of memory chunks and at least one processor configured to execute a plurality of consumer threads. A consumer thread of the plurality of consumer threads is configured to receive a consume request associated with an element and responsive to receiving the consume request, read a consumer sequence and a consumer buffer. The consumer thread is also configured to extract (i) a chunk identifier, associated with the consumer sequence and (ii) a slot position in a memory chunk from the consumer sequence. Additionally, the consumer thread is configured to determine that a position of the element mismatches the slot position in the memory chunk from the consumer sequence, determine that the memory chunk is recyclable, increase the consumer sequence, and consume the element at the slot position.

In a 28th exemplary aspect of the present disclosure, which may be used in combination with any one or more of the preceding aspects (e.g., the 27th aspect), consuming the element includes writing a NULL value into the slot position.

In a 29th exemplary aspect of the present disclosure, which may be used in combination with any one or more of the preceding aspects (e.g., the 27th aspect), the memory chunk includes a plurality of slots.

In a 30th exemplary aspect of the present disclosure, which may be used in combination with any one or more of the preceding aspects (e.g., the 29th aspect), the plurality of slots is arranged in an array, and each slot of the plurality of slots is associated with a sequence value and an item value.

In a 31st exemplary aspect of the present disclosure, which may be used in combination with any one or more of the preceding aspects (e.g., the 29th aspect), the consumer thread and another consumer thread are configured to simultaneously consume respective slots of the plurality of slots.

In a 32nd exemplary aspect of the present disclosure, which may be used in combination with any one or more of the preceding aspects (e.g., the 27th aspect), the at least one processor is configured to execute a producer thread that is configured to write additional items into the memory chunk.

In a 33rd exemplary aspect of the present disclosure, which may be used in combination with any one or more of the preceding aspects (e.g., the 32nd aspect), the consumer thread is configured to consume the additional items from the memory chunk.

In a 34th exemplary aspect of the present disclosure, which may be used in combination with any one or more of the preceding aspects (e.g., the 27th aspect), the plurality of memory chunks forms an unbounded queue.

In a 35th exemplary aspect of the present disclosure, which may be used in combination with any one or more of the preceding aspects (e.g., the 27th aspect), the memory chunk occupies at least two cache-lines.

In a 36th exemplary aspect of the present disclosure, which may be used in combination with any one or more of the preceding aspects (e.g., the 27th aspect), the memory chunk has a chunk size, and the chunk size is a fixed value.

Aspects of the subject matter described herein may be useful alone or in combination with one or more other aspects described herein. In a 37th exemplary aspect of the present disclosure a non-transitory machine-readable medium stores code, which when executed by at least one processor is configured to receive a consume request associated with an element and responsive to receiving the consume request, read a consumer sequence and a consumer buffer. The non-transitory machine-readable medium is also configured to extract (i) a chunk identifier, associated with the consumer sequence and (ii) a slot position in a memory chunk from the consumer sequence. Additionally, the non-transitory machine-readable medium is configured to determine that a position of the element mismatches the slot position in the memory chunk from the consumer sequence, determine that the memory chunk is recyclable, increase the consumer sequence; and consume the element at the slot position.

Aspects of the subject matter described herein may be useful alone or in combination with one or more other aspects described herein. In a 38th exemplary aspect of the present disclosure system includes a means for receiving a consume request associated with an element, a means for reading a consumer sequence and a consumer buffer, and a means for extracting (i) a chunk identifier, associated with the consumer sequence and (ii) a slot position in a memory chunk from the consumer sequence. The system also includes a first means for determining that a position of the element mismatches the slot position in the memory chunk from the consumer sequence and a second means for determining that the memory chunk is recyclable. Additionally, the system includes a means for increasing the consumer sequence, and a means for consuming the element at the slot position.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
receiving, by a producer thread of a plurality of producer threads, an offer request associated with an item;
responsive to receiving the offer request, increasing arithmetically, by the producer thread, a sequence according to a fetch-and-add instruction;
determining, by the producer thread, (i) a chunk identifier, associated with the sequence, of a memory chunk from a pool of memory chunks and (ii) a first slot position, from the sequence, in the memory chunk to offer the item, wherein the sequence contains values corresponding with slot positions and the first slot position is a next slot position in the sequence which corresponds to a second slot within the memory chunk;
comparing the chunk identifier with a current producer memory chunk;
walking the current producer memory chunk backwards to match the chunk identifier;
writing, by the producer thread, the item into the memory chunk at the first slot position;
determining, by a first consumer thread of a plurality of consumer threads, the first slot position of the item;
consuming, by the first consumer thread, the item at the first slot position;
consuming, by a second consumer thread of the plurality of consumer threads, another item at a second slot position in the memory chunk;
determining, by the second consumer thread referring to a consumer buffer coordinating the plurality of consumer threads, that the memory chunk is recyclable; and
recycling, by the second consumer thread, the memory chunk.

2. The method of claim 1, further comprising:
receiving, by the first consumer thread, a consume request prior to consuming the item at the first slot position;
reading, by the first consumer thread, a consumer sequence;
reading, by the first consumer thread, the consumer buffer; and
determining, by the first consumer thread, (i) a second chunk identifier associated with the consumer sequence and (ii) a third slot position from the consumer sequence.

3. The method of claim 1, further comprising writing, by the producer thread, additional items into the memory chunk after the memory chunk has been recycled.

4. The method of claim 3, further comprising consuming, by the at least one of the first consumer thread and the second consumer thread, the additional items from the memory chunk.

5. The method of claim 1, further comprising updating, by the producer thread, the sequence responsive to writing the item into the memory chunk at the first slot position.

6. The method of claim 5, wherein the sequence is one of a consumer sequence and a producer sequence, and the sequence is configured to ensure a sequence of operations between the plurality of producer threads and the plurality of consumer threads is coordinated.

7. A system comprising:
a memory configured to store a plurality of memory chunks;
at least one processor configured to execute a plurality of producer threads and a plurality of consumer threads, wherein a producer thread of the plurality of producer threads is configured to:
receive an offer request associated with an item,
responsive to receiving the offer request, arithmetically increase a sequence according to a fetch-and-add instruction,
determine (i) a chunk identifier, associated with the sequence, of a memory chunk from a pool of memory chunks and (ii) a first slot position, from the sequence, in the memory chunk to offer the item, wherein the sequence contains values corresponding with slot positions and the first slot position is a next slot position in the sequence which corresponds to a second slot within the memory chunk, compare the chunk identifier with a current producer memory chunk, walk the current producer memory chunk backwards to match the chunk identifier, and write the item into the memory chunk at the first slot position;

wherein a first consumer thread of the plurality of consumer threads is configured to:

consume the item at the first slot position; and wherein a second consumer thread of the plurality of consumer threads is configured to:

consume another item at a second slot position in the memory chunk, determine that the memory chunk is recyclable by referring to a consumer buffer coordinating the plurality of consumer threads, and recycle the memory chunk.

8. The system of claim 7, wherein consuming the second slot includes writing a NULL value into the second slot.

9. The system of claim 7, wherein the memory chunk includes a plurality of slots, and wherein the plurality of slots is arranged in an array, and each slot of the plurality of slots is associated with a sequence value and an item value.

10. The system of claim 9, wherein the first consumer thread and the second consumer thread are configured to simultaneously consume respective slots of the plurality of slots.

11. The system of claim 7, wherein the sequence is a producer sequence that is an array of 64-bit elements.

12. The system of claim 7, wherein at least one of the plurality of producer threads and the plurality of consumer threads is configured to reallocate the detached memory chunk back to the pool of memory chunks.

13. The system of claim 7, wherein the producer thread is configured to write additional items into the memory chunk, and wherein at least one of the first consumer thread and the second consumer thread are configured to consume the additional items from the memory chunk.

14. The system of claim 7, wherein the plurality of memory chunks forms an unbounded queue, and wherein the memory chunk occupies at least two cache-lines.

15. A method comprising:

receiving, by a consumer thread of a plurality of consumer threads, a consume request associated with an element;

responsive to receiving the consume request, reading, by the consumer thread, a consumer sequence and a consumer buffer;

extracting, by the consumer thread, (i) a chunk identifier, associated with the consumer sequence and (ii) a slot position in a memory chunk from the consumer sequence, wherein the sequence contains values corresponding with slot positions and the first slot position is a next slot position in the sequence which corresponds to a second slot within the memory chunk;

determining, by the consumer thread, that a position of the element mismatches the slot position in the memory chunk from the consumer sequence;

determining, by the consumer thread referring to the consumer buffer coordinating the plurality of consumer threads, that the memory chunk is recyclable;

arithmetically increasing according to a fetch-and-add instruction, by the consumer thread, the consumer sequence; and consuming, by the consumer thread, the element at the slot position.

16. The method of claim 15, further comprising writing, by a producer thread, additional elements into the memory chunk.

17. The method of claim 16, further comprising consuming, by the consumer thread and a different consumer thread, the additional elements from the memory chunk.

18. The method of claim 15, wherein consuming the element includes writing a NULL value into the slot position.

19. The method of claim 15, further comprising:

determining, by the consumer thread, that a second position of the element matches the slot position in the memory chunk from the consumer sequence; and reducing, by the consumer thread, the consumer sequence to a reduced consumer sequence;

comparing, by the consumer thread, the reduced consumer sequence to the chunk identifier.

20. The method of claim 15, wherein consuming the element includes writing a NULL value into the slot position, and wherein the method further comprises calculating the distance between the producer sequence and the consumer sequence in order to determine whether the queue is empty, and responsive to the queue not being empty, calculating a nonzero size of the queue using the distance between the producer sequence and the consumer sequence.

* * * * *